US008706085B2

(12) United States Patent
Zhang et al.

(10) Patent No.: US 8,706,085 B2
(45) Date of Patent: Apr. 22, 2014

(54) METHOD AND APPARATUS FOR AUTHENTICATING COMMUNICATION DEVICE

(71) Applicant: Huawei Technologies Co., Ltd., Shenzhen (CN)

(72) Inventors: Lijia Zhang, Beijing (CN); Yixian Xu, Beijing (CN); Yingxin Huang, Beijing (CN); Xiaohan Liu, Shenzhen (CN); Meriau Laurence, Paris (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 13/649,540

(22) Filed: Oct. 11, 2012

(65) Prior Publication Data

US 2013/0035067 A1    Feb. 7, 2013

Related U.S. Application Data

(63) Continuation of application No. PCT/CN2011/072651, filed on Apr. 12, 2011.

(30) Foreign Application Priority Data

Apr. 12, 2010   (CN) .......................... 2010 1 0149674

(51) Int. Cl.
*H04M 1/66*   (2006.01)
(52) U.S. Cl.
USPC .................. 455/411; 455/410; 455/432.1
(58) Field of Classification Search
USPC ....................... 455/411, 410, 432.1
See application file for complete search history.

(56) References Cited

U.S. PATENT DOCUMENTS

| 5,729,537 A | 3/1998 | Billström |
| 2004/0208187 A1 | 10/2004 | Mizell et al. |
| 2007/0223398 A1* | 9/2007 | Luo et al. ...................... 370/254 |

(Continued)

FOREIGN PATENT DOCUMENTS

| CN | 1691603 | 11/2005 |
| CN | 101511082 | * 8/2009 |

(Continued)

OTHER PUBLICATIONS

Extended European Search Report mailed Apr. 23, 2013 for corresponding European Application No. 11768422.5.

(Continued)

*Primary Examiner* — Manpreet Matharu
(74) *Attorney, Agent, or Firm* — Staas & Halsey LLP

(57) ABSTRACT

Embodiments of the present invention disclose a method and an apparatus for authenticating a communication device, where the method includes: receiving an attach request including a group identifier and sent by an MTC device to be authenticated, where the group identifier is a group identifier of an MTC group where the MTC device to be authenticated is located; determining whether a first group authentication vector bound to the group identifier exists locally, where the first group authentication vector is an authentication vector used for authenticating MTC devices in the MTC group; and if existing, according to the first group authentication vector, authenticating the MTC device to be authenticated, and generating a system key of the MTC device to be authenticated. The technical solutions provided in the present invention can be applied to the technical field of authenticating the MTC device.

16 Claims, 18 Drawing Sheets

(56) References Cited

U.S. PATENT DOCUMENTS

| | | | |
|---|---|---|---|
| 2008/0064369 A1* | 3/2008 | Xie et al. .................. 455/411 |
| 2009/0054036 A1 | 2/2009 | Chen et al. |
| 2009/0054037 A1 | 2/2009 | Kaippallimalil |
| 2009/0191857 A1* | 7/2009 | Horn et al. .................. 455/419 |
| 2011/0246777 A1* | 10/2011 | Buckley et al. .............. 713/172 |

FOREIGN PATENT DOCUMENTS

| | | | |
|---|---|---|---|
| CN | 101640887 | * | 2/2010 |
| JP | 2011/089464 A1 | | 7/2011 |
| JP | 2012/097883 A1 | | 7/2012 |
| WO | 2009/095295 | | 8/2009 |
| WO | 2011/110101 | | 9/2011 |

OTHER PUBLICATIONS

International Search Report, mailed Jul. 21, 2011, in corresponding International Application No. PCT/CN2011/072651 (3 pp.).

Written Opinion of the International Searching Authority, mailed Jul. 21, 2011, in corresponding International Application No. PCT/CN2011/072651 (7 pp.).

International Search Report of PCT/CN2011/072651 mailed Jul. 21, 2011.

Office Action, dated May 6, 2013, in corresponding Chinese Application No. 201010149674.X (14 pp.).

* cited by examiner

METHOD AND APPARATUS FOR AUTHENTICATING COMMUNICATION DEVICE

CROSS-REFERENCE TO RELATED APPLICATIONS

This application is a continuation of International Application No. PCT/CN2011/072651, filed on Apr. 12, 2011, which claims priority to Chinese Patent Application No. 201010149674.X, filed on Apr. 12, 2010, both of which are hereby incorporated by reference in their entireties.

FIELD OF THE INVENTION

The present invention relates to the field of wireless communication, and in particular, to a method and an apparatus for authenticating a communication device.

BACKGROUND OF THE INVENTION

A machine type communication (Machine Type Communication, MTC) device can communicate with a network side merely after two-way authentication between the MTC device and the network side succeeds. In the 3rd generation partnership project (3rd Generation Partnership Project, 3GPP) standard, a group-based attribute is put forward for the distribution of MTC devices, that is, the MTC devices that are located in the same geographic location, have the same attributes, or belong to the same user may be taken as a group. A group of MTC devices can directly access a network, and can also access the network through a gateway.

In the prior art, each MTC device has an international mobile subscriber identity (International Mobile Subscriber Identity, IMSI), and the identity IMSI is unique. In a process of two-way authentication between the MTC device and the network side, the network side generates an authentication vector (Authentication Vector, AV) according to a basic key K which corresponds to the unique IMSI of the MTC device, and completes the two-way authentication between the MTC device and the network side according to the AV. Different MTC devices generate different authentication vectors AVs by using different basic keys K which correspond to different IMSIs, so as to complete the two-way authentication.

Since the number of the MTC devices is large, if the existing authentication method is adopted, when a large number of MTC devices access the network in a short period of time, the signaling traffic generated during the authentication process increases rapidly, resulting in network congestion.

SUMMARY OF THE INVENTION

Embodiments of the present invention provide a method and an apparatus for authenticating a communication device, so that each MTC device can be effectively authenticated in the case that a large number of MTC devices access a network in a short period of time.

In order to achieve the foregoing objective, the embodiments of the present invention adopt the following technical solutions:

A method for authenticating an MTC device includes:
receiving an attach request including a group identifier and sent by an MTC device to be authenticated, where the group identifier is a group identifier of an MTC group where the MTC device to be authenticated is located;
determining whether a first group authentication vector bound to the group identifier exists locally; and
if existing, according to the first group authentication vector, authenticating the MTC device to be authenticated, and generating a system key of the MTC device to be authenticated.

A method for authenticating an MTC device includes:
after authentication between a primary MTC device in an MTC group and a network side succeeds, receiving an attach request sent by a second MTC device in the MTC group;
authenticating the second MTC device, and generating a system key for the second MTC device by using a group authentication vector generated in the process of authentication between the primary MTC device and the network side; and
sending the system key to the second MTC device.

A method for authenticating an MTC device includes:
sending, by a primary MTC device in an MTC group, an attach request to a network side, where the attach request includes a group identifier of the MTC group and device characteristics of the other MTC devices to be authenticated in the MTC group;
performing authentication between the primary MTC device and the network side, and by using the device characteristics of the other MTC devices to be authenticated and a group authentication vector, generating system keys for the other MTC devices to be authenticated, where the group authentication vector is generated in the process of authentication between the primary MTC device and the network side; and
after the primary MTC device successfully authenticates the other MTC devices to be authenticated, sending, by the primary MTC device, the system keys to the other MTC devices to be authenticated.

A network side entity includes:
a first receiving unit, configured to receive an attach request including a group identifier and sent by an MTC device to be authenticated, where the group identifier is a group identifier of an MTC group where the MTC device to be authenticated is located; and
a first authentication unit, configured to: when a first group authentication vector bound to the group identifier received by the first receiving unit exists, according to the first group authentication vector, authenticate the MTC device to be authenticated, and generate a system key of the MTC device to be authenticated.

A device for authenticating an MTC device includes:
a third receiving unit, configured to, after authentication between the device and a network side succeeds, receive an attach request sent by a second MTC device in an MTC group where the device is located;
a fourth authentication unit, configured to authenticate the second MTC device, and generate a system key for the second MTC device by using a group authentication vector generated in a process of authentication between the device and the network side; and
a second sending unit, configured to send the system key generated by the fourth authentication unit to the second MTC device.

A device for authenticating an MTC device includes:
a third sending unit, configured to send an attach request to a network side, where the attach request includes a group identifier of an MTC group where the device is located and a device characteristic of an MTC device to be authenticated in the MTC group;
a fifth authentication unit, configured to perform two-way authentication between the device and the network side, and by using a group authentication vector and the device characteristic which is of the MTC device to be authenticated, generate a system key for the MTC device to be authenticated, where the group authentication vector is generated in the process of authentication between the device and the network side; and a fourth sending unit, configured to, after the device successfully authenticates the MTC device to be authenticated, send the system key generated by the fifth authentication unit to the MTC device to be authenticated.

In the method and the apparatus for authenticating an MTC device provided in the embodiments of the present invention, a group authentication vector is acquired through a group identifier shared by an MTC group, an MTC device to be authenticated in the group is authenticated through the group authentication vector, or the system key is generated for the authenticated MTC device in the group through the group authentication vector, thereby avoiding the problem that different authentication vectors need to be generated for different MTC devices in an authentication process or a process of generating the system key, so that the signaling traffic is greatly reduced, and network congestion is not caused even in a case that a large number of MTC devices access the network in a short period of time. Through the method and the apparatus for authenticating an MTC device provided in the embodiments of the present invention, each MTC device can also be effectively authenticated in the case that a large number of MTC devices access the network in a short period of time.

DETAILED DESCRIPTION OF THE EMBODIMENTS

Figure 1:
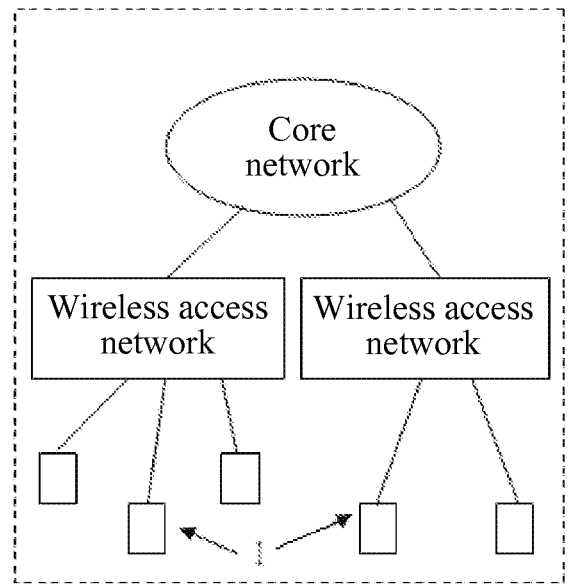
FIG. 1 is a first scenario that group-based MTC devices access a network.
Figure 2:
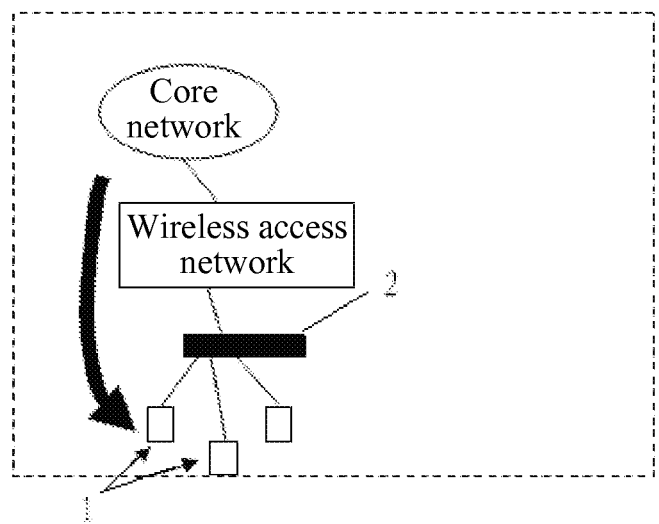
FIG. 2 is a second scenario that group-based MTC devices access a network.
Figure 3:
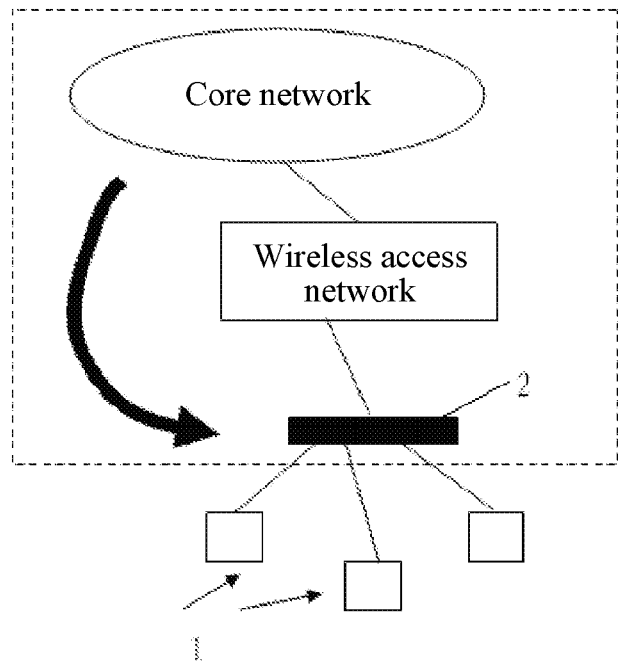
FIG. 3 is a third scenario that group-based MTC devices access a network.

FIG. 1, FIG. 2, and FIG. 3 show three possible scenarios of an MTC group which the embodiments of the present invention are based on, where numeral 1 represents an MTC device, and numeral 2 represents an MTC gateway. In FIG. 1, a group of MTC devices 1 directly access the 3GPP network. An MTC gateway is not required in the network architecture, and each MTC device can communicate with the network merely after two-way authentication is performed between the MTC device and the network. In FIG. 2, a group of MTC devices access the 3GPP network through the MTC gateway 2, but the network side can identify each MTC device connected to the gateway. That is, from the perspective of the network side, the MTC gateway is equivalent to an ordinary MTC device and has all functions of an ordinary MTC device. From the perspective of each MTC device in the group, the MTC gateway provides the other MTC devices in the group with an external connection channel. Each MTC device and the MTC gateway can communicate with the network side merely after the authentication succeeds. In FIG. 3, a group of MTC devices access the 3GPP network through the MTC gateway 2, but the network side can merely identify the MTC gateway while cannot identify the MTC devices connected to the gateway. The MTC gateway can communicate with the network merely after two-way authentication is performed between the MTC gateway and the network. The MTC gateway 2 may be an MTC device which has a gateway function.

To solve the problem of network congestion caused by the increase of signaling traffic in the case that a large number of MTC devices access the network in the prior art, the embodiments of the present invention provide a method and an apparatus for authenticating a communication device.

Figure 4:
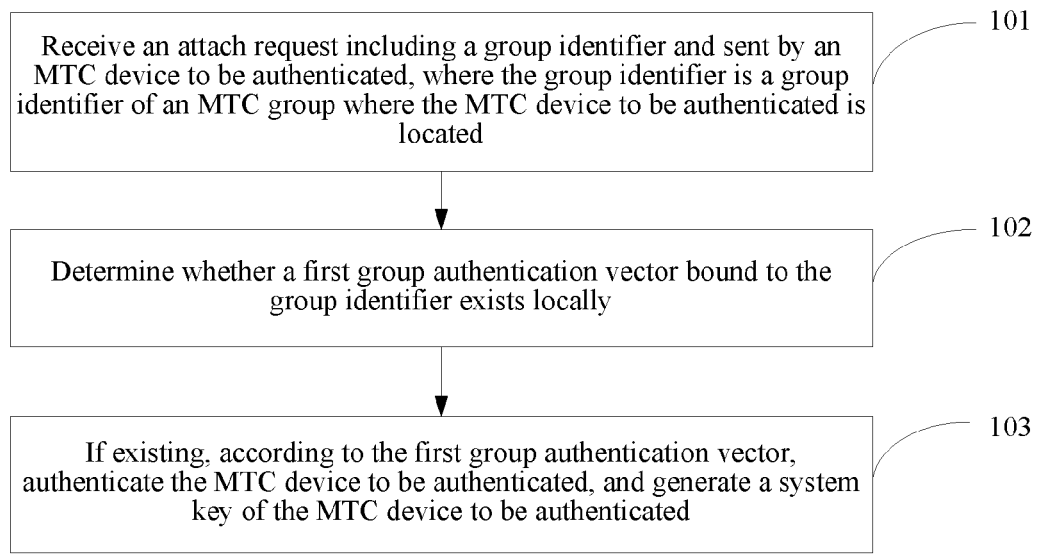
FIG. 4 is a flow chart of a method for authenticating an MTC device according to a first embodiment of the present invention.

As shown in FIG. 4, a method for authenticating an MTC device according to a first embodiment of the present invention includes:

Step 101: Receive an attach request including a group identifier and sent by an MTC device to be authenticated, where the group identifier is a group identifier of an MTC group where the MTC device to be authenticated is located.

In this embodiment, the MTC device to be authenticated is an MTC device which needs to communicate with a network and is in an MTC group. Before the MTC device accesses the network, two-way authentication between the MTC device and the network needs to be performed and a system key needs to be generated. In this embodiment, a group identifier is set for each MTC group, where the group identifier is unique and may be represented by a Group IMSI, and different MTC groups have different Group IMSIs.

Step 102: Determine whether a first group authentication vector bound to the group identifier exists locally.

In this embodiment, the group authentication vector refers to an authentication vector used for authenticating an MTC device in the MTC group, and multiple MTC devices to be authenticated in the MTC group may share the group authentication vector for authentication. The first group authentication vector is generated in a process of two-way authentication between a MTC device and the network, where the MTC device is the first to access the network and is in the MTC group. The first group authentication vector is bound to the group identifier, so that another MTC device that belongs to the same MTC group can quickly find the group authentication vector when it needs to access the network, and does not need to regenerate one. The MTC device that is the first to access the network refers to an MTC device that is the first to send an attach request to the network in the case that currently no MTC device in the MTC group accesses the network.

Step 103: If existing, according to the first group authentication vector, authenticate the MTC device to be authenticated, and generate a system key of the MTC device to be authenticated.

In this embodiment, the system key of the MTC device to be authenticated includes a network side key and a device side key.

In the method for authenticating an MTC device provided in the embodiment of the present invention, a group authentication vector is acquired through a group identifier shared by an MTC group, an MTC device to be authenticated in the group is authenticated through the group authentication vector, and a system key is generated, thereby avoiding the problem that different authentication vectors need to be generated for different MTC devices in a process of authenticating and generating the system key, so that the signaling traffic is greatly reduced, and network congestion is avoided even in the case that a large number of MTC devices access the network in a short period of time. Meanwhile, the sharing one group identifier also solves the problem that the IMSI of 15 bits is insufficient for use when the number of the MTC devices is large. Through the method for authenticating an MTC device provided in the embodiment of the present invention, each MTC device can be effectively authenticated in the case that a large number of MTC devices access the network in a short period of time.

Further, in step 102, if it is determined that the first group authentication vector bound to the group identifier does not exist locally, it is required to acquire the first group authentication vector, which specifically includes the following steps:

Step 1021: Acquire the first group authentication vector from a server according to the group identifier.

In this embodiment, the server is a specific server at the network side. For example, in a universal mobile telecommunication system (Universal Mobile Telecommunication System, UMTS) network, the server is a home location register (Home Location Register, HLR); and in a long term evolution (Long Term Evolution, LTE) network, the server is a home subscriber system (Home Subscriber System, HSS).

Step 1022: Establish a binding relationship between the group identifier and the acquired first group authentication vector.

In this embodiment, the purpose of establishing the binding relationship is to enable that the acquired first group authentication vector can be directly used to authenticate the other MTC devices in the same MTC group and generate system keys, and does not need to be reacquired every time.

Further, the attach request received in step 101 may further include a second device characteristic. In the MTC group, the device characteristic can uniquely identify an MTC device in the MTC group. The second device characteristic is a parameter used for identifying the MTC device to be authenticated. The second device characteristic may be a position parameter of the MTC device to be authenticated, and may also be another parameter that can uniquely identify the MTC device to be authenticated. When the attach request includes the second device characteristic, and after it is determined that the first group authentication vector exists locally, the method further includes the following steps:

It is determined whether the second device characteristic is the same as a locally stored first device characteristic, where the first device characteristic is a device characteristic of the MTC device that first accesses the network and is in the MTC group, and it is bound to the group identifier and the first group authentication vector; and the second device characteristic is a device characteristic of another MTC device in the group. When the second device characteristic is different from the locally stored first device characteristic, that is, when the MTC device to be authenticated is not the MTC device that is the first to access the network, according to the first group authentication vector, the MTC device to be authenticated is authenticated, and a system key of the MTC device to be authenticated is generated. When the second device characteristic is the same as the locally stored first device characteristic, that is, when the MTC device to be authenticated is the MTC device that is the first to access the network, a group authentication vector is reacquired according to the group identifier, and the reacquired group authentication vector is referred to as a second group authentication vector; and the second group authentication vector is also different from the first group authentication vector because a random number used when the group authentication vector is acquired each time is different. Then, a binding relationship among the group identifier, the second device characteristic, and the acquired second group authentication vector is established, and according to an expected response number generated by the second group authentication vector and the second device characteristic, the MTC device to be authenticated is authenticated; and a system key of the MTC device to be authenticated is generated according to the second group authentication vector and the second device characteristic.

To make persons of ordinary skill in the art understand the technical solutions provided in the first embodiment of the present invention more clearly, the technical solutions provided in the first embodiment is described in detail in the following through a specific application scenario.

Figure 5:
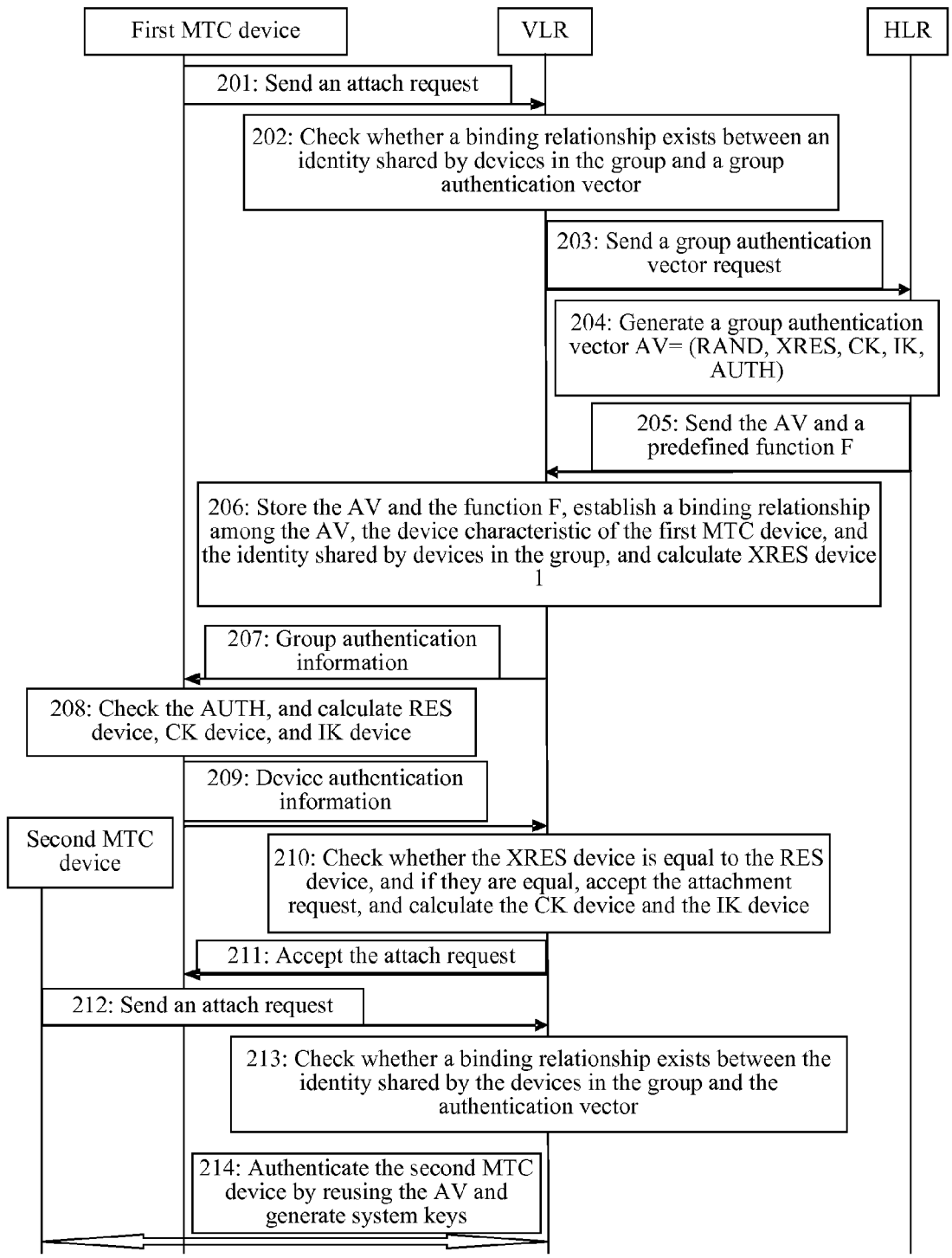
FIG. 5 is a schematic flow chart that a first embodiment of the present invention is applied to a UMTS network.

As shown in FIG. 5, the method for authenticating an MTC device according to the first embodiment of the present invention may be applied to a first scenario shown in FIG. 1. In this embodiment, a group of MTC devices share one identity Group IMSI and one basic key K corresponding to the identity. When a first MTC device in the group accesses a network, two-way authentication between the MTC device and the network is performed, and system keys are generated. When another MTC device accesses the network, a group authentication vector acquired by the first MTC device is reused to perform two-way authentication between the device and the network and generate system keys. The first MTC device refers to an MTC device that first sends an attach request to the network in the case that currently no MTC device in the MTC group accesses the network. In a UMTS network, the method includes the following steps:

Step 201: The first MTC device sends an attach request to a visited location register (Visited Location Register, VLR), where the attach request includes an identity Group IMSI shared by the devices in the group, a device characteristic device position 1 of the first MTC device and a time stamp time stamp 1, and the time stamp is generated based on the time when the attach request is sent. The device position indicates a position of each device in the MTC device group and is used as a device characteristic of each device. The device characteristic may be designated by a user owning the group of MTC devices, and an operator may be informed of the device characteristic in a registration stage. Alternatively, a certain device in the group of MTC devices informs the operator of information of the group of MTC devices during registration, and then the operator assigns the device characteristic to each MTC device. Definitely, another characteristic may also be selected as the device characteristic, which is not listed here one by one.

Step 202: After receiving the attach request of the first MTC device, the VLR checks whether a binding relationship exists between the Group IMSI and the group authentication vector, that is, determines whether an authentication vector bound to the Group IMSI exists.

Since it is the first MTC device, the binding relationship does not exist, and a new group authentication vector needs to be acquired.

Step 203: The VLR sends an authentication vector request to a home location register (Home Location Register, HLR), where the request includes the Group IMSI.

Step 204: The HLR finds a corresponding basic key K according to the Group IMSI, and generates a group authentication vector AV=(RAND, XRES, CK, IK, AUTH), where RAND indicates a random number, XRES indicates an expected response number, CK indicates an encryption key, IK indicates an integrity key, and AUTH indicates an authentication token. It should be noted that, the HLR may generate one AV, and may also generate a group of AVs, and send the AV or the AVs to the VLR. The VLR may use the one AV repeatedly or use the group of AVs circularly to authenticate the MTC device.

Step 205: The HLR sends the AV and a predefined function F to the VLR.

It should be noted that, the function F may also be directly configured in the VLR, and is used to calculate parameters such as the system keys or the device expected response number in subsequent steps.

Step 206: The VLR stores the AV and the function F, and establishes a binding relationship among the AV, the device characteristic device position 1 of the first MTC device, and the identity Group IMSI shared by the devices in the group; and then calculates an expected response number XRES device 1=F (device position 1, time stamp 1, XRES) of the first MTC device by using the function F, where the device position 1 is a parameter received in step 202, and XRES is a parameter in the group authentication vector AV.

Step 207: The VLR sends group authentication information to the first MTC device, where the group authentication information is a parameter acquired from the AV, and includes the random number RAND and the authentication token AUTH.

Step 208: After receiving the group authentication information, the first MTC device checks the authentication token AUTH, and if the AUTH is correct, completes the authentication on the network side performed by the first MTC device; and calculates a response number RES device 1=F (device position 1, time stamp 1, RES) of the first MTC device, an encryption key CK device 1=F (device position 1, time stamp 1, CK) of the first MTC device, and an integrity key IK device 1=F (device position 1, time stamp 1, IK) of the first MTC device.

Step 209: The first MTC device sends device authentication information including the RES device 1 to the VLR.

Step 210: The VLR checks whether XRES device 1 is equal to the received RES device 1; if they are equal, accepts the attach request of the first MTC device, completes the authentication on the first MTC device performed by the network, and calculates network side keys CK device 1=F (device position 1, time stamp 1, CK) and IK device 1=F (device position 1, time stamp 1, IK).

Step 211: The VLR sends a message indicating that the attach request is accepted to the first MTC device, so as to complete two-way authentication between the first MTC device and the network.

Step 212: A second MTC device sends an attach request to the VLR, where the message includes a device position 2, a time stamp 2, and a Group IMSI.

Step 213: After receiving the attach request of the second MTC device, the VLR checks whether a binding relationship exists between the Group-IMSI and the AV, if not existing, requests a new AV from the HLR; and if existing, checks whether the device position 2 in the attach request is the same as a device position bound to the Group-IMSI and the AV, if not the same, authenticates the second MTC device by using the existing AV, and if the same, requests a new AV from the HLR.

In this step, since it is the second MTC device, it is not required to apply for a new AV. The AV that the first MTC device applies for is directly used to perform authentication, and system keys are generated. The method is the same as the method for authenticating the first MTC device, which is not repeatedly described here again.

In the foregoing method for authenticating the second MTC device, the MTC device that is the second to access the network is taken as an example for description. However, the method is not limited to authenticating the MTC device that is the second to send the attach request in the current MTC group, and the method is applicable to all the other MTC devices that subsequently send attach requests, except the first MTC device, in the MTC group.

It should be noted that, besides the time stamp time stamp, another parameter, such as a random number RAND may also be used to generate system keys. Partial functions (for example, calculating XRES device, CK device, and IK device by using the function F, and checking the binding relationship between the Group IMSI and the AV) executed by the VLR may also be executed in the HLR. When the MTC device that is the first to access the network is shut down, while the other MTC devices still need to communicate with the network side, the VLR needs to store a shutdown record of the MTC device that is the first to access the network, so as to ensure that the other MTC devices can acquire new AVs in the case that the MTC device that is the first to access the network is shut down.

Figure 6:
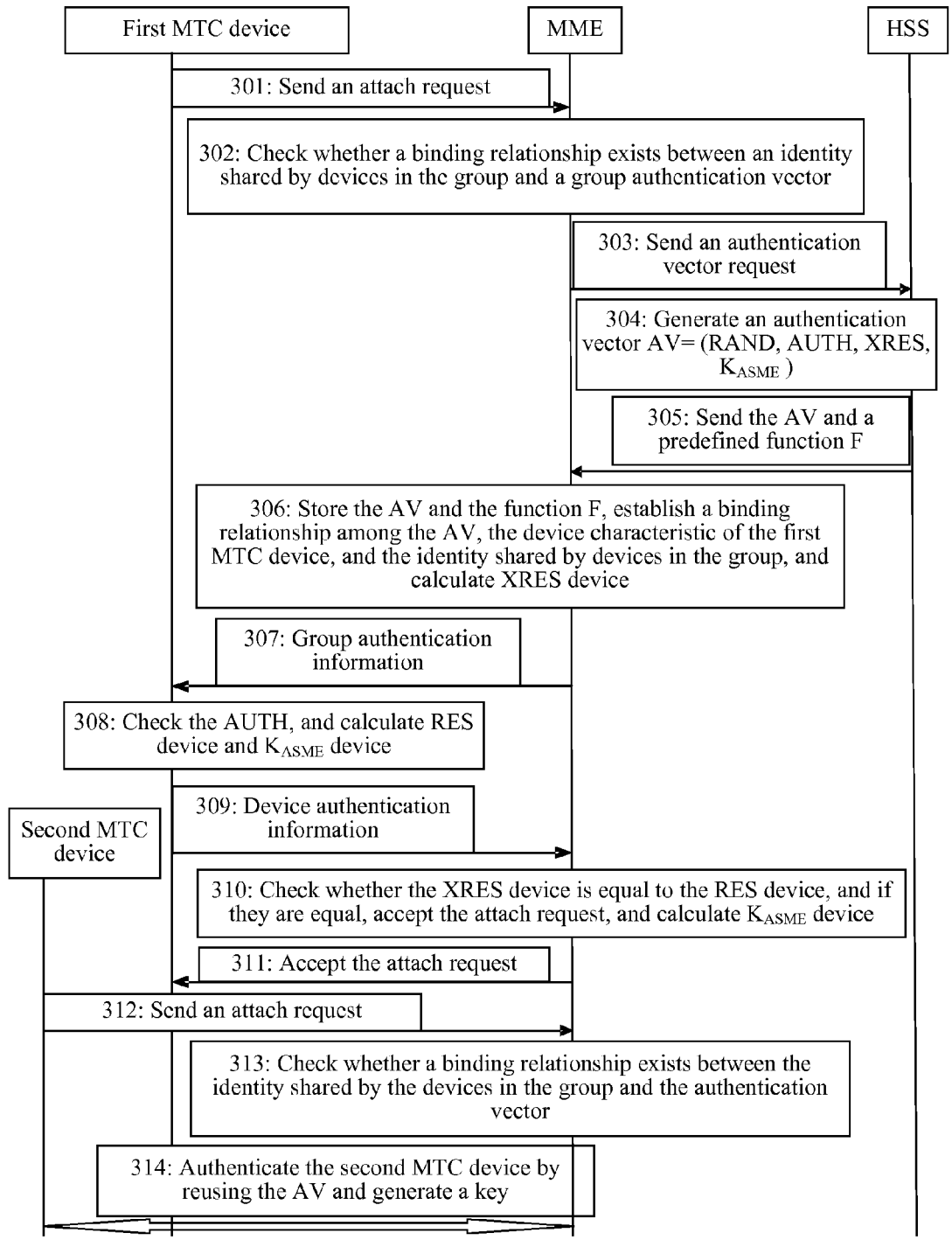
FIG. 6 is a schematic flow chart that a first embodiment of the present invention is applied to an LTE network.

As shown in FIG. 6, the foregoing method may also be applied to a long term evolution (Long Term Evolution, LTE) network. The difference lies in that, the VLR in the UMTS network corresponds to a mobility management entity (Mobility Management Entity, MME) in the LTE network, and the HLR in the UMTS network corresponds to a home subscriber system (Home Subscriber System, HSS) in the LTE network. The method includes:

Step 301: The first MTC device sends an attach request to the MME, where the attach request includes an identity Group IMSI shared by the devices in the group, a device characteristic device position 1 of the first MTC device and time stamp time stamp 1, and the time stamp is generated based on the time when the attach request is sent.

Step 302: After receiving the attach request of the first MTC device, the MME checks whether a binding relationship exists between the Group IMSI and the authentication vector AV, that is, determines whether an authentication vector bound to the Group IMSI exists. Since it is the first MTC device, the binding relationship does not exist, and a new authentication vector AV needs to be acquired.

Step 303: The MME sends an authentication vector request to the home subscriber system (Home Subscriber System, HSS), where the request includes the Group IMSI.

Step 304: The HSS finds a corresponding K according to the Group IMSI, and generates an authentication vector AV=(RAND, AUTH, XRES, $K_{ASME}$), where the HSS may generate one AV, and may also generate a group of AVs, and send the AV or the AVs to the MME; and the MME may use the one AV repeatedly or use the group of AVs circularly to authenticate the MTC device.

Step 305: The HSS sends the AV and a predefined function F to the MME. It should be noted that, the function F may also be directly configured in the MME.

Step 306: The MME stores the AV and the function F, and establishes a binding relationship among the AV, the device characteristic device position 1 of the first MTC device, and the identity Group IMSI shared by devices in the group; and then, calculates an expected response number XRES device 1=F(device position 1, time stamp 1, XRES) of the first MTC device by using the function F.

Step 307: The MME sends group authentication information to the first MTC device, where the group authentication information includes a random number RAND and an authentication token AUTH.

Step 308: After receiving the group authentication information, the first MTC device checks the authentication token AUTH; if the AUTH is correct, completes the authentication on the network side performed by the first MTC device; and calculates the response number RES device 1=F (device position 1, time stamp 1, RES) and a parameter $K_{ASME}$ device 1=F (Device position 1, time stamp 1, $K_{ASME}$) of the first MTC device.

Step 309: The first MTC device sends device authentication information including the RES device 1 to the MME.

Step 310: The MME checks whether XRES device 1 is equal to the received RES device 1; if they are equal, accepts the attach request of the first MTC device, completes the authentication on the first MTC device performed by the network, and calculates a network side $K_{ASME}$ device 1=F (Device position 1, time stamp 1, $K_{ASME}$).

Step 311: The MME sends a message indicating that the attach request is accepted to the first MTC device, so as to complete two-way authentication between the first MTC device and the network.

Step 312: A second MTC device sends an attach request to the MME, where the message includes a device position 2, a time stamp 2 and a Group IMSI.

Step 313: After receiving the attach request of the second MTC device, the MME checks whether a binding relationship exists between the Group-IMSI and the AV, if not existing, requests a new AV from the HSS; and if existing, checks whether the device position 2 in the attach request is the same as a device position bound to the Group-IMSI and the AV, if not the same, authenticates the second MTC device by using the existing AV, and if the same, requests a new AV from the HSS.

In this step, since it is the second MTC device, it is not required to apply for a new AV. The AV that the first MTC device applies for is directly used for authentication, and a system key is generated. The method is the same as the method for authenticating the first MTC device, which is not repeatedly described here again.

In the foregoing method for authenticating the second MTC device, the MTC device that is the second to access the network is taken as an example for description. However, the method is not limited to authenticating the MTC device that is the second to send the attach request in the current MTC group, and the method is applicable to all the MTC devices that subsequently send attach requests, except the first MTC device, in the MTC group.

It should be noted that, besides the time stamp time stamp, another parameter, such as a random number RAND, may also be used to generate a system key. Partial functions (for example, calculating XRES device and $K_{ASME}$ device by using the function F) executed by the MME may also be executed in the HSS. When the MTC device that is the first to access the network is shut down, while the other MTC devices still need to communicate with the network side, the MME needs to store a shutdown record of the MTC device that is the first to access the network, so as to ensure that the other MTC devices can acquire new AVs in the case that the MTC device that is the first to access the network is shut down.

In the method for authenticating an MTC device provided in the embodiment of the present invention, a group authentication vector is acquired through a group identifier shared by an MTC group, an MTC device to be authenticated in the group is authenticated through the group authentication vector, and a system key is generated, thereby avoiding the problem that different authentication vectors need to be generated for different MTC devices in a process of authenticating and generating the system key, so that the signaling traffic is greatly reduced, and network congestion is avoided even in the case that a large number of the MTC devices access the network in a short period of time. Meanwhile, the sharing one group identifier also solves the problem that the IMSI of 15 bits is insufficient for use when the number of the MTC devices is large. Through the method for authenticating an MTC device provided in the embodiment of the present invention, each MTC device can also be effectively authenticated in the case that a large number of the MTC devices access the network in a short period of time.

Figure 7:
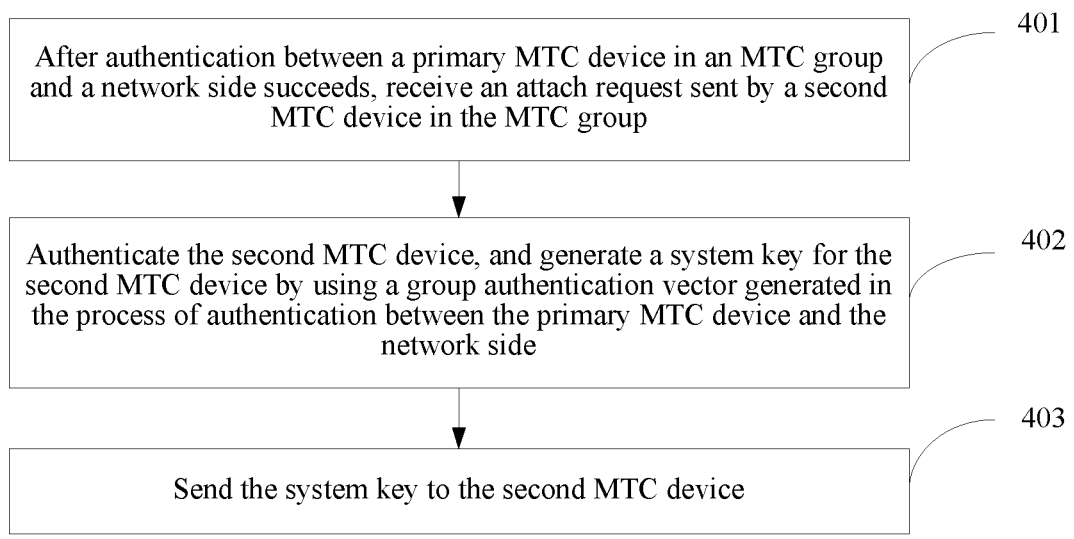
FIG. 7 is a flow chart of a method for authenticating an MTC device according to a second embodiment of the present invention.

As shown in FIG. 7, a method for authenticating an MTC device according to a second embodiment of the present invention includes:

Step 401: After authentication between a primary MTC device in an MTC group and a network side succeeds, receive an attach request sent by a second MTC device in the MTC group.

In this embodiment, the primary MTC device may be a gateway in the MTC group, and may also be a designated MTC device. Two-way authentication between the primary MTC device and the network side is performed, and then the primary MTC device authenticates the other MTC devices to be authenticated in the group.

Step 402: Authenticate the second MTC device, and generate a system key for the second MTC device by using a group authentication vector generated in the process of authentication between the primary MTC device and the network side.

In this embodiment, the second MTC device is any MTC device, except the primary MTC device, in the group, and the system key is generated for the second MTC device by reusing the group authentication vector.

Step 403: Send the system key to the second MTC device.

In this embodiment, the system key includes a network side key and a device side key, and a key sent by the primary MTC device to the second MTC device is a device side key of the second MTC device.

In the method for authenticating an MTC device provided in the embodiment of the present invention, two-way authentication between a primary MTC device in an MTC group and the network side is first performed, and system keys are generated for the other successfully authenticated MTC devices in the group by using a group authentication vector generated in their two-way authentication process, thereby avoiding the problem in the prior art that it is required to use different authentication vectors to generate system keys for different MTC devices. Through the method provided in this embodiment, the signaling traffic is greatly reduced, and network congestion is also avoided even in the case that a large number of MTC devices access the network in a short period of time.

Further, after the authentication between the primary MTC device in the group and the network side succeeds, a binding relationship between the group authentication vector generated in the authentication process and the group identifier is established, so that the other MTC devices to be authenticated in the group may rapidly find the group authentication vector according to the group identifier when sending an attach request including the group identifier and a device characteristic (referred to as a device characteristic of the second MTC device) of the MTC device to the primary MTC device, and the group authentication vector and the device characteristic which is of the MTC device may be used to generate a system key for the MTC device.

To make persons of ordinary skill in the art understand the technical solutions provided in the second embodiment of the present invention more clearly, the technical solutions provided in the second embodiment is described in detail in the following through a specific application scenario.

Figure 8:
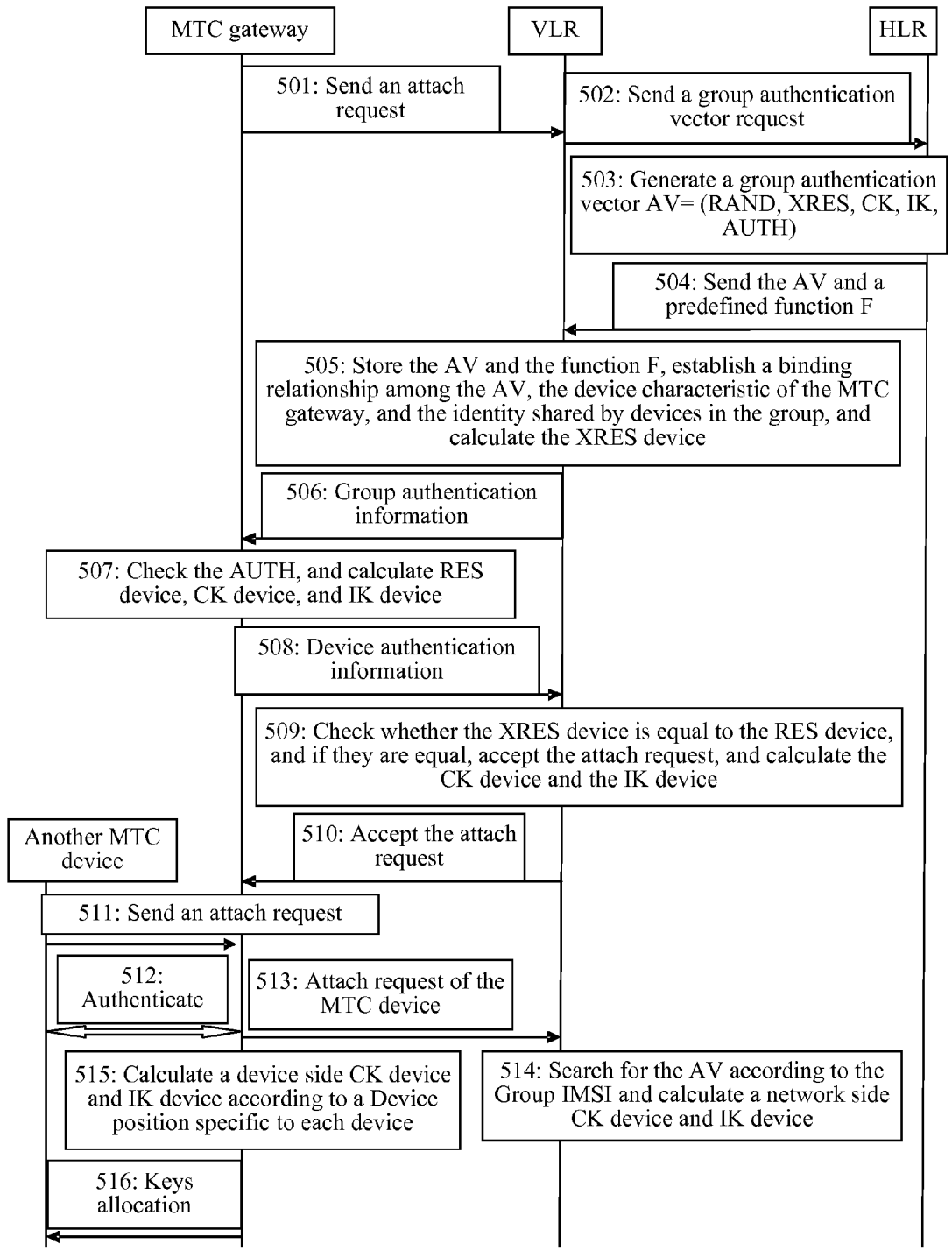
FIG. 8 is a schematic flow chart that a second embodiment of the present invention is applied to a UMTS network.

As shown in FIG. 8, the method for authenticating an MTC device according to the second embodiment of the present invention may be applied to a second scenario shown in FIG. 2 and a third scenario shown in FIG. 3. In this embodiment, a group of MTC devices share one identity Group IMSI and one corresponding basic key K. When an MTC gateway in the group accesses the network, two-way authentication between the MTC gateway and the network is performed, and system keys are generated. An MTC gateway is responsible for authenticating the other MTC devices in the group, generating keys by reusing an AV acquired by the MTC gateway, and assigning the keys to the other MTC devices. In a UMTS network, the method includes the following steps:

Step 501: The MTC gateway sends an attach request to a VLR, where the request includes an identity Group IMSI shared by the devices in the group, a device characteristic device position of the MTC gateway, and a time stamp, and the time stamp is generated based on the time when the attach request is sent.

Step 502: The VLR sends an authentication vector AV request to an HLR, where the request includes a Group IMSI.

Step 503: The HLR finds a corresponding K according to the Group IMSI, and generates an authentication vector AV=(RAND, XRES, CK, IK, AUTH), where RAND indicates a random number, XRES indicates an expected response number, CK indicates an encryption key, IK indicates an integrity key, and AUTH indicates an authentication token.

Step 504: The HLR sends the AV and a predefined function F to the VLR. It should be noted that, the function F may also be directly configured in the VLR, and is used to calculate parameters such as the system keys or the device expected response number in subsequent steps.

Step 505: The VLR stores the AV and the function F, and establishes a binding relationship among the AV, the device characteristic device position of the MTC gateway, and the identity Group IMSI shared by the devices in the group; and then calculates an expected response number XRES device=F (device position, time stamp, XRES) of the MTC gateway by using the function F, where the device position is a parameter received in step 502, and XRES is a parameter in the group authentication vector AV.

Step 506: The VLR sends group authentication information to the MTC gateway, where the group authentication information includes a random number RAND and an authentication token AUTH.

Step 507: After receiving the group authentication information, the MTC gateway checks the authentication token AUTH; if the AUTH is correct, completes the authentication on the network side performed by the MTC gateway; and calculates a response number RES device=F (device position, time stamp, RES) of the MTC gateway, an encryption key of the MTC gateway CK device=F (device position, time stamp, CK), and an integrity key IK of the MTC gateway IK device=F(device position, time stamp, IK).

Step 508: The MTC gateway sends device authentication information including the RES device to the VLR.

Step 509: The VLR checks whether the XRES device is equal to the received RES device; if they are equal, accepts the attach request of the MTC gateway, completes the authentication on the MTC gateway performed by the network, and calculates network side keys CK device=F (device position, time stamp, CK) and IK device=F (device position, time stamp, IK).

Step 510: The VLR sends a message indicating that the attach request is accepted to the MTC gateway, so as to complete two-way authentication between the MTC gateway and the network.

Step 511: Another MTC device in the group sends an attach request to the MTC gateway, where the message includes a device position 2 of the MTC device, a time stamp 2, and a Group IMSI.

Step 512: After receiving the attach request of another MTC device in the group, the MTC gateway authenticates the MTC device.

Step 513: If the MTC gateway successfully authenticates the MTC device, the MTC gateway sends the attach request of the MTC device to the VLR, where the attach request includes the Group IMSI, the time stamp 2, and the device position 2.

Step 514: The VLR finds the AV received in step 505 according to the Group IMSI, and calculates the network side keys CK device 2=F (device position 2, time stamp 2, CK) and IK device 2=F (device position 2, time stamp 2, IK).

Step 515: The MTC gateway calculates device side keys CK device 2=F (device position 2, time stamp 2, CK) and IK device 2=F (device position 2, time stamp 2, IK) according to the device characteristic device position 2 of the MTC device.

Step 516: The MTC gateway allocates the generated device side keys CK device 2 and IK device 2 to the MTC device.

It should be noted that, the MTC gateway may also be a primary device in a group of MTC devices, and it is the first to be authenticated and access the network. Besides the time stamp time stamp, another parameter, such as a random number RAND, may also be used to generate system keys.

Figure 9:
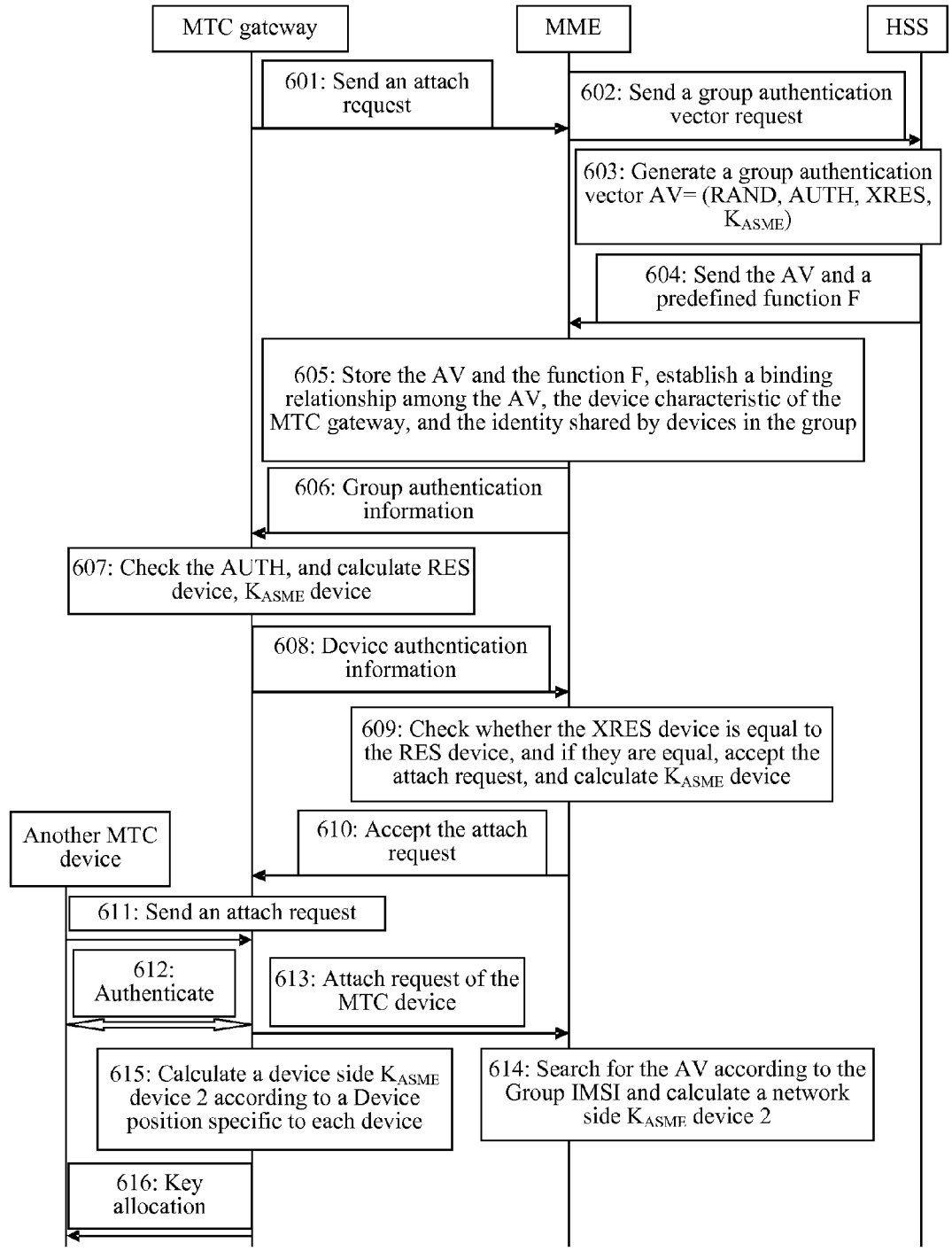
FIG. 9 is a schematic flow chart that a second embodiment of the present invention is applied to an LTE network.

As shown in FIG. 9, the foregoing method may also be applied in an LTE network. The difference lies in that, the VLR in the UMTS network corresponds to an MME in the LTE network, and the HLR in the UMTS network corresponds to an HSS in the LTE network. The specific implementation method is described as follows:

Step 601: The MTC gateway sends an attach request to the MME, where the request includes an identity Group IMSI shared by the devices in the group, a device characteristic "device position" of the MTC gateway, and a time stamp, and the time stamp is generated based on the time when the attach request is sent.

Step 602: The MME sends an authentication vector AV request to the HSS, where the request includes a Group IMSI.

Step 603: The HSS finds a corresponding K according to the Group IMSI, and generates an authentication vector AV=(RAND, AUTH, XRES, $K_{ASME}$).

Step 604: The HSS sends the AV and a predefined function F to the MME.

Step 605: The MME stores the AV and the function F, and establishes a binding relationship among the AV, a device characteristic device position of the MTC gateway, and the identity Group IMSI shared by devices in the group; and then, calculates an expected response number XRES device=F (device position, time stamp, XRES) of the MTC gateway by using the function F.

Step 606: The MME sends group authentication information to the MTC gateway, where the group authentication information includes a random number RAND and an authentication token AUTH.

Step 607: After receiving the group authentication information, the MTC gateway checks the authentication token AUTH; if the AUTH is correct, completes the authentication on the network side performed by the MTC gateway; and calculates a response number RES device=F (device position, time stamp, RES) of the MTC gateway and a parameter $K_{ASME}$ device=F (Device position, time stamp, $K_{ASME}$).

Step 608: The MTC gateway sends device authentication information including the RES device to the MME.

Step 609: The MME checks whether the XRES device is equal to the received RES device; if they are equal, accepts the attach request of the MTC gateway, completes the authentication on the MTC gateway performed by the network, and calculates a network side $K_{ASME}$ device=F (Device position, time stamp, $K_{ASME}$).

Step 610: The MME sends a message indicating that the attach request is accepted to the MTC gateway, so as to complete two-way authentication between the MTC gateway and the network.

Step 611: Another MTC device in the group sends an attach request to the MTC gateway, where the message includes a device position 2 of the MTC device, a time stamp 2, and a Group IMSI.

Step 612: After receiving the attach request of another MTC device in the group, the MTC gateway authenticates the MTC device.

Step 613: If the MTC gateway successfully authenticates the MTC device, the MTC gateway sends the attach request of the MTC device to the MME, where the attach request includes the Group IMSI and the device position 2.

Step 614: According to the Group IMSI, the MME finds the AV received in step 605, and calculates network side $K_{ASME}$ device 2=F (Device position 2, time stamp 2, $K_{ASME}$).

Step 615: The MTC gateway calculates device side $K_{ASME}$ device 2=F (Device position 2, time stamp 2, $K_{ASME}$) according to the device characteristic device position 2 of the MTC device.

Step 616: The MTC gateway allocates the generated device side $K_{ASME}$ device 2 to the MTC device.

It should be noted that, the MTC gateway may also be a primary device in a group of MTC devices, and it is the first to be authenticated and access the network. Besides the time stamp time stamp, another parameter, such as a random number RAND, may also be used to generate a system key.

In the method for authenticating an MTC device provided in the embodiment of the present invention, two-way authentication between a primary MTC device in an MTC group and the network side is first performed, and a system key is generated for the other successfully authenticated MTC devices in the group by using a group authentication vector generated in their two-way authentication process, thereby avoiding the problem in the prior art that it is required to use different authentication vectors to generate system keys for different MTC devices. Through the method provided in this embodiment, the signaling traffic is greatly reduced, and network congestion is avoided even in the case that a large number of MTC devices access the network in a short period of time.

Figure 10:
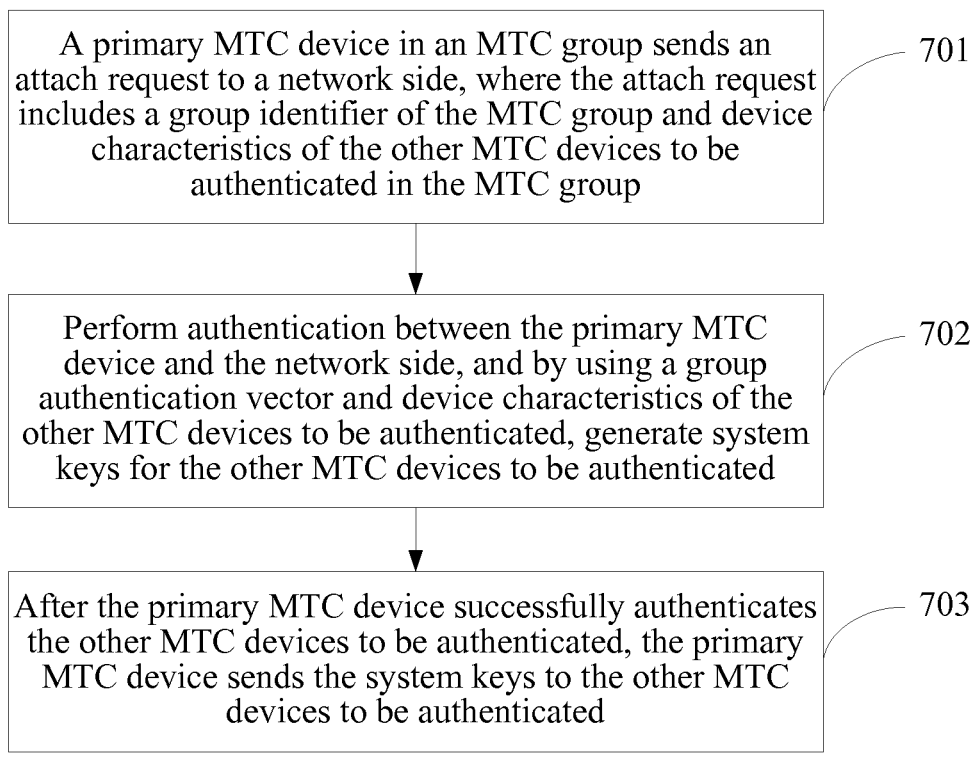
FIG. 10 is a flow chart of a method for authenticating an MTC device according to a third embodiment of the present invention.

As shown in FIG. 10, a method for authenticating an MTC device according to a third embodiment of the present invention includes:

Step 701: A primary MTC device in an MTC group sends an attach request to a network side, where the attach request includes a group identifier of the MTC group and device characteristics of the other MTC devices to be authenticated in the MTC group.

In this embodiment, one or more other MTC devices to be authenticated may exist in the MTC group. The primary MTC device functions to perform batch processing, and different MTC devices correspond to the same group identifier and different device characteristics. In the subsequent process of generating system keys, different system keys are generated for different MTC devices according to the different device characteristics, thereby ensuring the system security and improving the processing efficiency.

Step 702: Perform authentication between the primary MTC device and the network side, and by using a group authentication vector and device characteristics of the other MTC devices to be authenticated, generate system keys for the other MTC devices to be authenticated, where the group authentication vector is generated in the process of authentication between the primary MTC device and the network side.

Step 703: After the primary MTC device successfully authenticates the other MTC devices to be authenticated, the primary MTC device sends the system keys to the other MTC devices to be authenticated.

In this embodiment, the system keys include network side keys and device side keys, and the keys sent by the primary MTC device to the MTC devices to be authenticated are their device side keys.

In the method for authenticating an MTC device provided in the embodiment of the present invention, a group authentication vector is acquired through a group identifier shared by an MTC group, system keys are generated for all MTC devices to be authenticated in the group through the group authentication vector, and the generated system keys are allocated to the MTC devices, thereby avoiding the problem in the prior art that high signaling traffic is generated because different authentication vectors need to be used to generate system keys for different MTC devices. Through the method provided in this embodiment, the signaling traffic is greatly reduced, and network congestion is avoided even in the case that a large number of MTC devices access the network in a short period of time. Meanwhile, the sharing one group identifier also solves the problem that the IMSI of 15 bits is insufficient for use when the number of the MTC devices is large.

To make persons of ordinary skill in the art understand the technical solutions provided in the third embodiment of the present invention more clearly, the technical solutions provided in the third embodiment is described in detail in the following through a specific application scenario.

Figure 11:
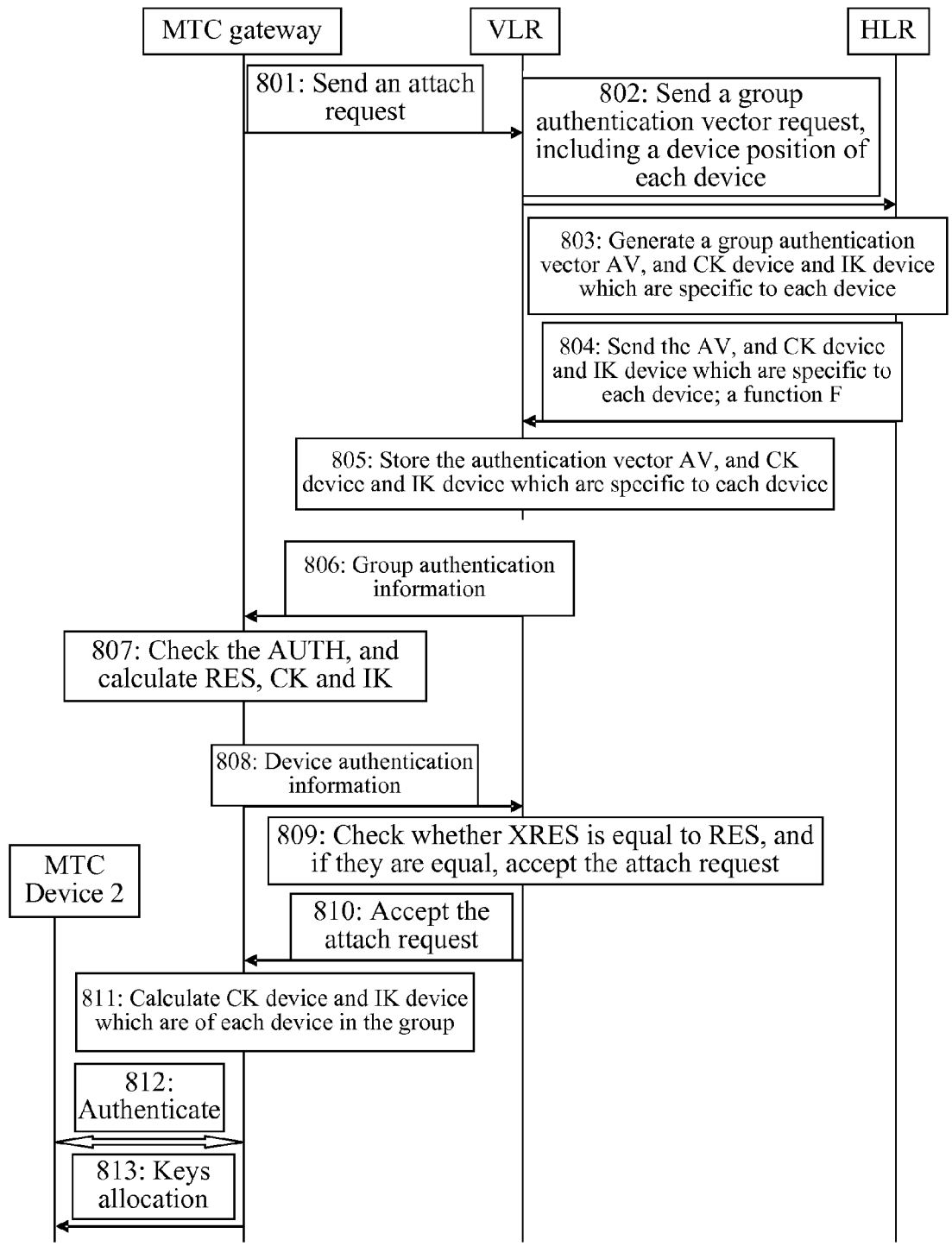
FIG. 11 is a schematic flow chart that a third embodiment of the present invention is applied to a UMTS network.

As shown in FIG. 11, the method for authenticating an MTC device according to the third embodiment of the present invention may be applied to a second scenario shown in FIG. 2 and a third scenario shown in FIG. 3. In this embodiment, a group of MTC devices share one identity Group IMSI and one corresponding basic key K. When an MTC gateway in the group accesses the network, two-way authentication between the MTC gateway and the network is performed, device characteristics of the other MTC devices to be authenticated in the group are sent to the network side once, and system keys are generated for the other MTC devices in the group by reusing an authentication vector AV. An MTC gateway is responsible for authenticating the other MTC devices in the group and assigning keys to the other MTC devices in the group. In a UMTS network, the method includes the following steps:

Step 801: The MTC gateway sends an attach request to a VLR, where the request includes an identity Group IMSI shared by the devices in the group, a time stamp, and device characteristics device position 1, device position 2, device position 3 . . . of the MTC devices in the group, and the time stamp is generated based on the time when the attach request is sent.

Step 802: The VLR sends an authentication vector AV request to an HLR, where the request includes the Group IMSI, and the device characteristics device position 1, device position 2, device position 3 . . . of the MTC devices in the group that are indicated by device position n.

Step 803: The HLR finds a corresponding K according to the Group IMSI, generates an authentication vector AV= (RAND, XRES, CK, IK, AUTH), where RAND indicates a random number, XRES indicates an expected response number, CK indicates an encryption key, IK indicates an integrity key, and AUTH indicates an authentication token; and calculates a network side encryption key CK device n=F (device position n, time stamp, CK) and a network side integrity key IK device n=F (device position n, time stamp, IK) of each device by using the device characteristic "device position n" of the devices in the group.

Step 804: The HLR sends the AV, a predefined function F, and the network side encryption key CK device of each MTC device and the network side integrity key IK device of each MTC device to the VLR. Definitely, the function F may also be directly configured in the VLR.

Step 805: The VLR stores the AV, the function F, and the network side encryption key CK device of each device and the network side integrity key IK device of each device.

Step 806: The VLR sends group authentication information to the MTC gateway, where the group authentication information includes a random number RAND and an authentication token AUTH.

Step 807: After receiving the group authentication information, the MTC gateway checks the authentication token AUTH; if the AUTH is correct, completes the authentication on the network side performed by the MTC gateway; and calculates a response number RES, the encryption key CK, and the integrity key IK.

Step 808: The MTC gateway sends device authentication information including the RES to the VLR.

Step 809: The VLR checks whether the XRES is equal to the received RES, and if they are equal, accepts the attach request of the MTC gateway, and completes the authentication on the MTC gateway performed by the network.

Step 810: The VLR sends a message indicating that the attach request is accepted to the MTC gateway, so as to complete two-way authentication between the MTC gateway and the network.

Step 811: The MTC gateway calculates an encryption key CK device n=F (device position n, time stamp, CK) and IK device n=F (device position n, time stamp, IK) that are of each MTC device according to the CK, the IK, and the device characteristic device position n of each MTC device that are calculated in step 807.

Step 812: The MTC gateway authenticates each MTC device in the group.

Step 813: If the authentication succeeds, the MTC gateway allocates the CK device n and the IK device n that are calculated in step 811 to the corresponding MTC device.

It should be noted that, the MTC gateway may also be a primary device in a group of MTC devices, and it is the first to be authenticated and access the network. Besides the time stamp, another parameter, such as a random number RAND, may also be used to generate system keys.

Figure 12:
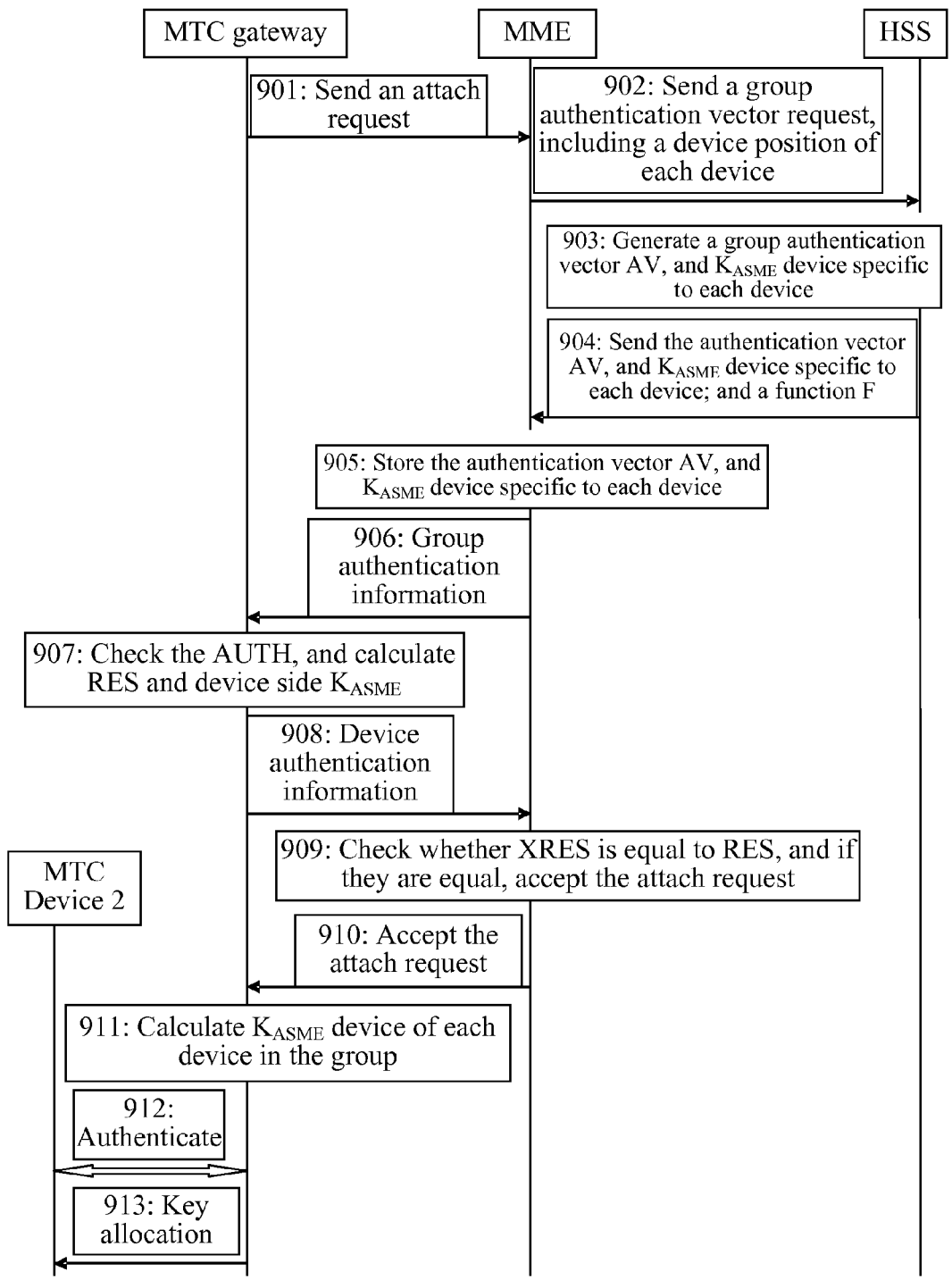
FIG. 12 is a schematic flow chart that a third embodiment of the present invention is applied to an LTE network.

As shown in FIG. 12, the foregoing method may also be applied in an LTE network. The difference lies in that, the VLR in the UMTS network corresponds to an MME in the LTE network, and the HLR in the UMTS network corresponds to an HSS in the LTE network. The specific implementation method is described as follows:

Step 901: The MTC gateway sends an attach request to the MME, where the request includes an identity Group IMSI shared by the devices in the group, a time stamp, and device characteristics device position 1, device position 2, device position 3 . . . of the MTC devices in the group, and the time stamp is generated based on the time when the attach request is sent.

Step 902: The MME sends an authentication vector AV request to the HSS, where the request includes the Group IMSI, and device characteristics device position 1, device position 2, device position 3 . . . of the MTC devices in the group that are indicated by device position n.

Step 903: The HSS finds a corresponding K according to the Group IMSI, generates an authentication vector AV= (RAND, AUTH, XRES, $K_{ASME}$), and calculates network side $K_{ASME}$ device n=F (Device position n, time stamp, $K_{ASME}$) of each device by using the device characteristic device position n of each device in the group.

Step 904: The HSS sends the AV, a predefined function F, and network side $K_{ASME}$ device of each MTC device to the MME.

Step 905: The MME stores the AV, the function F, and the network side $K_{ASME}$ device of each MTC device.

Step 906: The MME sends group authentication information to the MTC gateway, where the group authentication information includes a random number RAND and an authentication token AUTH.

Step 907: After receiving the group authentication information, the MTC gateway checks the authentication token AUTH; if the AUTH is correct, completes the authentication on the network side performed by the MTC gateway; and calculates a response number RES and device side $K_{ASME}$.

Step 908: The MTC gateway sends device authentication information including the RES to the MME.

Step 909: The MME checks whether the XRES is equal to the received RES; and if they are equal, accepts the attach request of the MTC gateway, and completes the authentication on the MTC gateway performed by the network.

Step 910: The MME sends a message indicating that the attach request is accepted to the MTC gateway, so as to complete two-way authentication between the MTC gateway and the network.

Step 911: The MTC gateway calculates $K_{ASME}$ device n=F (device position n, time stamp, $K_{ASME}$) of each MTC device according to $K_{ASME}$ and the device characteristic device position n of each MTC device that are calculated in step 907.

Step 912: The MTC gateway authenticates each MTC device in the group.

Step 913: If the authentication succeeds, the MTC gateway allocates the $K_{ASME}$ device n calculated in step 911 to the corresponding MTC device.

It should be noted that, the MTC gateway may also be a primary device in a group of MTC devices, and it is the first to be authenticated and access the network. Besides the time stamp, another parameter, such as a random number RAND, may also be used to generate a system key.

In the method for authenticating an MTC device provided in the embodiment of the present invention, a group authentication vector is acquired through a group identifier shared by an MTC group, system keys are generated once for the other MTC devices to be authenticated in the group through the group authentication vector, and the generated system keys are allocated to the MTC devices, thereby avoiding the problem in the prior art that high signaling traffic is generated because different authentication vectors need to be used to generate system keys for different MTC devices. Through the method provided in this embodiment, the signaling traffic is greatly reduced, and network congestion is avoided even in the case that a large number of MTC devices access the network in a short period of time. Meanwhile, the sharing one group identifier also solves the problem that the IMSI of 15 bits is insufficient for use when the number of the MTC devices is large.

Figure 13:
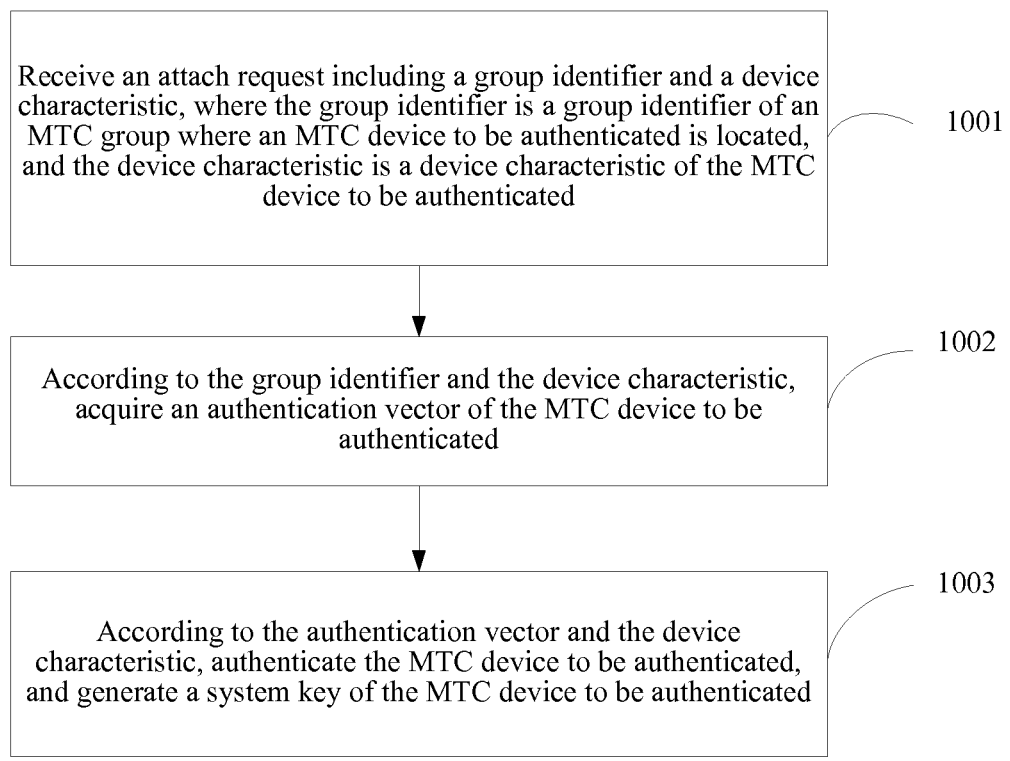
FIG. 13 is a flow chart of a method for authenticating an MTC device according to a fourth embodiment of the present invention.

As shown in FIG. 13, a method for authenticating an MTC device according to a fourth embodiment of the present invention includes:

Step 1001: Receive an attach request including a group identifier and a device characteristic, where the group identifier is a group identifier of an MTC group where an MTC device to be authenticated is located, and the device characteristic is a device characteristic of the MTC device to be authenticated.

Step 1002: According to the group identifier and the device characteristic, acquire an authentication vector of the MTC device to be authenticated.

Step 1003: According to the authentication vector and the device characteristic, authenticate the MTC device to be authenticated, and generate a system key for the MTC device to be authenticated.

In the method for authenticating an MTC device provided in the embodiment of the present invention, an authentication vector is acquired by sharing one group identifier, thereby solving the problem that an IMSI of 15 bits is insufficient for use when the number of MTC devices is large. Meanwhile, different system keys are generated for different MTC devices according to different device characteristics, thereby ensuring the system security and improving the processing efficiency. Through the method for authenticating an MTC device provided in the embodiment of the present invention, each MTC device can also be effectively authenticated in the case that a large number of the MTC devices access the network in a short period of time.

To make persons of ordinary skill in the art understand the technical solutions provided in the fourth embodiment of the present invention more clearly, the technical solutions provided in the fourth embodiment is described in detail in the following through a specific application scenario.

Figure 14:
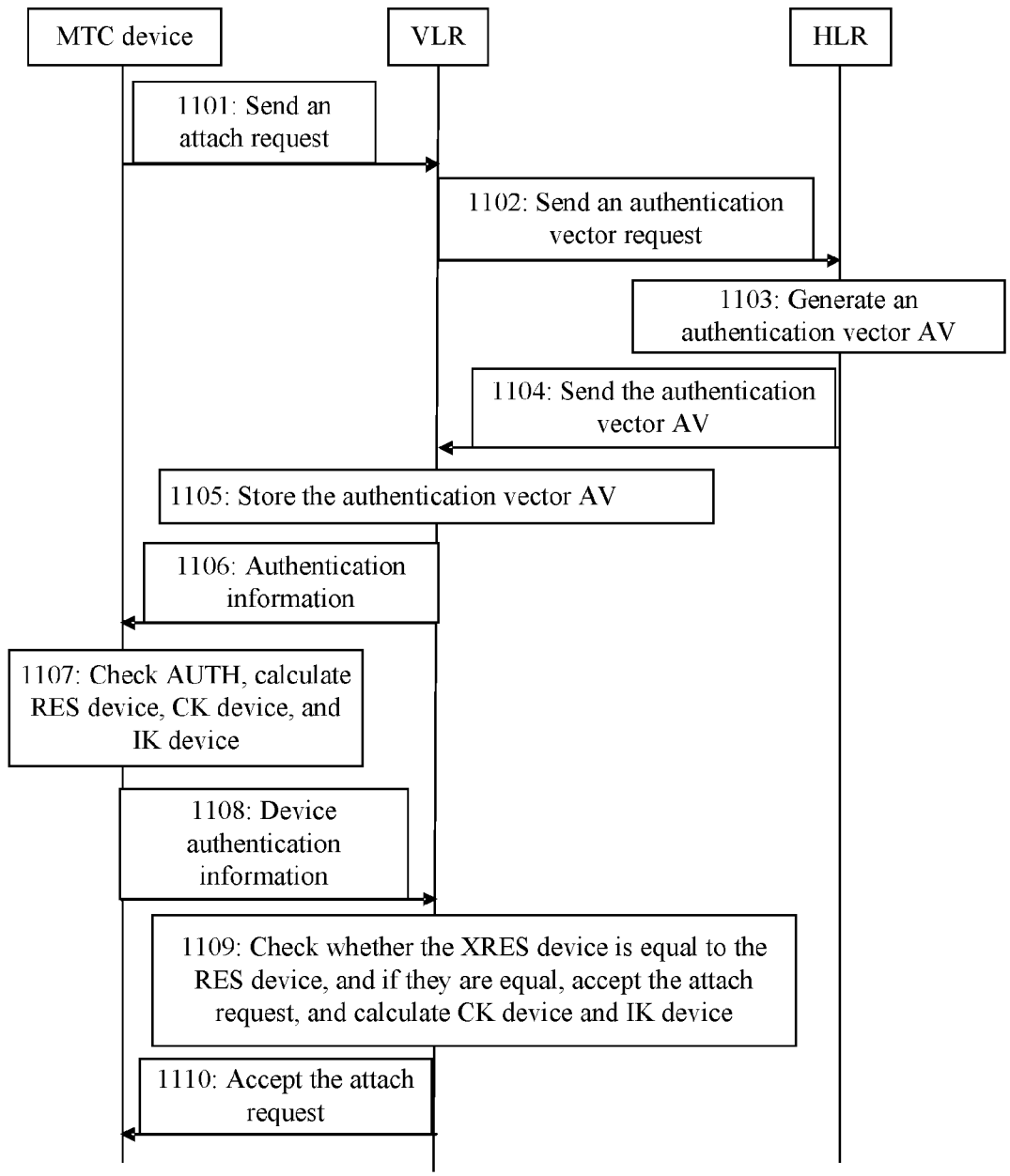
FIG. 14 is a schematic flow chart that a fourth embodiment of the present invention is applied to a UMTS network.

As shown in FIG. 14, the method for authenticating an MTC device according to the fourth embodiment of the present invention may be applied to a first scenario shown in FIG. 1. In this embodiment, a group of MTC devices share one identity Group IMSI, and the identity Group IMSI and device characteristics device position correspond to different basic keys K. Each MTC device in the group accesses the network through the Group IMSI and the device characteristic device position. The MTC devices are authenticated based on different K, and system keys are generated. In a UMTS network, the method includes the following steps:

Step 1101: An MTC device sends an attach request to a VLR, where the attach request includes the identity Group IMSI shared by the devices in the group and a device characteristic "device position" of the MTC device.

Step 1102: The VLR sends an authentication vector AV request to an HLR, where the request includes the Group IMSI and the device position.

Step 1103: The HLR finds a corresponding basic key K according to the Group IMSI and the device position, and generates an AV=(RAND, XRES device, CK, IK, AUTH) by using a predefined function F, where XRES device=F (device position, XRES).

Step 1104: The HLR sends the AV and the predefined function F to the VLR. It should be noted that, the function F may also be directly configured in the VLR.

Step 1105: The VLR stores the AV and the function F.

Step 1106: The VLR sends authentication information to the MTC device, where the authentication information includes a random number RAND and an authentication token AUTH.

Step 1107: After receiving the authentication information, the MTC device checks the authentication token AUTH; if the AUTH is correct, completes the authentication on the network side performed by the MTC device; and calculates a response number RES device=F (device position, RES) of the MTC device, an encryption key CK device=F(device position, CK) of the MTC device, and an integrity key IK device=F(device position, IK) of the MTC device.

Step 1108: The MTC device sends device authentication information including the RES device to the VLR.

Step 1109: The VLR checks whether the XRES device is equal to the received RES device; if they are equal, accepts the attach request of the MTC device, completes the authentication on the MTC device performed by the network, and calculates network side keys CK device=F (device position, CK) and IK device=F (device position, IK).

Step 1110: The VLR sends a message indicating that the attach request is accepted to the MTC device, so as to complete two-way authentication between the MTC device and the network.

Figure 15:
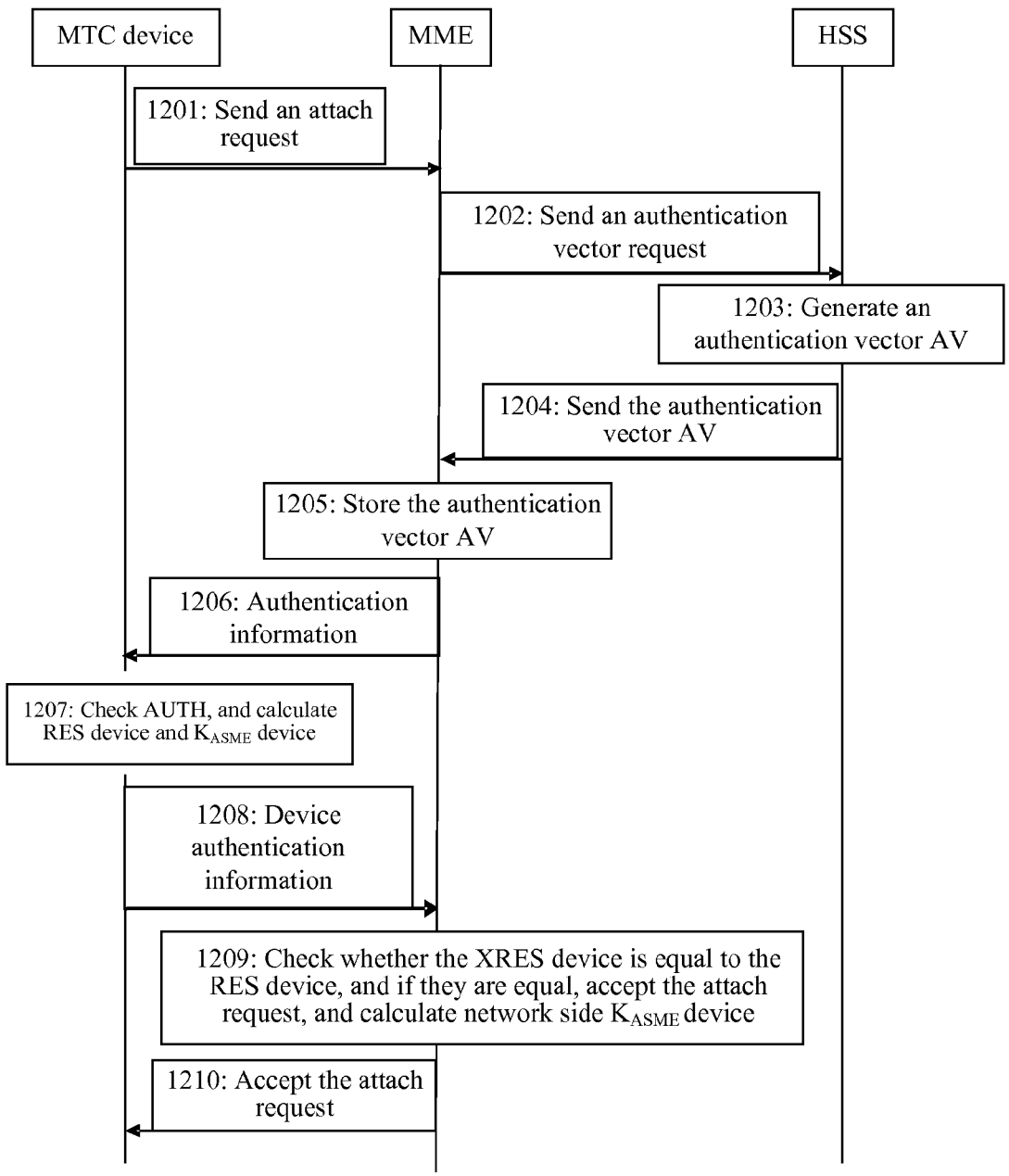
FIG. 15 is a schematic flow chart that a fourth embodiment of the present invention is applied to an LTE network.

As shown in FIG. 15, the foregoing method may also be applied in an LTE network. The difference lies in that, the VLR in the UMTS network corresponds to an MME in the LTE network, and the HLR in the UMTS network corresponds to an HSS in the LTE network. The specific implementation method is described as follows:

Step 1201: An MTC device sends an attach request to the MME, where the attach request includes an identity Group IMSI shared by the devices in the group and a device characteristic "device position" of the MTC device.

Step 1202: The MME sends an authentication vector AV request to the HSS, where the request includes the Group IMSI and the device position.

Step 1203: The HSS finds a corresponding basic key K according to the Group IMSI and the device position, and generates an AV=(RAND, AUTH, XRES device, $K_{ASME}$) by using a predefined function F, where XRES device=F (device position, XRES).

Step 1204: The HSS sends the AV and a predefined function F to the MME. It should be noted that, the function F may also be directly configured in the MME.

Step 1205: The MME stores the AV and the function F.

Step 1206: The MME sends authentication information to the MTC device, where the authentication information includes a random number RAND and an authentication token AUTH.

Step 1207: After receiving the authentication information, the MTC device checks the authentication token AUTH; if the AUTH is correct, completes the authentication on the network side performed by the MTC device; and calculates a response number RES device=F(device position, RES) of the MTC device and $K_{ASME}$ device=F (device position, $K_{ASME}$) of the MTC device.

Step 1208: The MTC device sends device authentication information including the RES device to the MME.

Step 1209: The MME checks whether the XRES device is equal to the received RES device; if they are equal, accepts the attach request of the MTC device, completes the authentication on the MTC device performed by the network, and calculates network side $K_{ASME}$ device=F (device position, $K_{ASME}$).

Step 1210: The MME sends a message indicating that the attach request is accepted to the MTC device, so as to complete two-way authentication between the MTC device and the network.

In the method for authenticating an MTC device provided in the embodiment of the present invention, an authentication vector is acquired by sharing one group identifier, thereby solving the problem that an IMSI of 15 bits is insufficient for use when the number of MTC devices is large. Meanwhile, different system keys are generated for different MTC devices according to different device characteristics, thereby ensuring the system security and improving the processing efficiency. Through the method for authenticating an MTC device provided in the embodiment of the present invention, each MTC device can also be effectively authenticated in the case that a large number of the MTC devices access the network in a short period of time.

Figure 16:
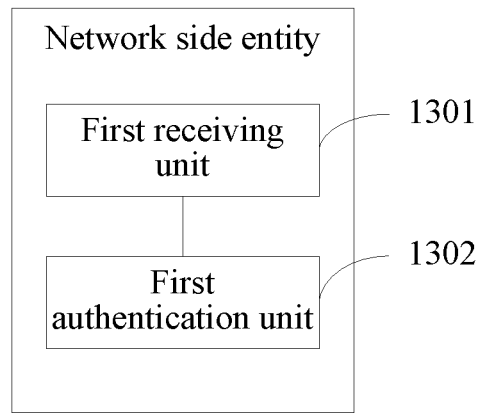
FIG. 16 is a first schematic structural diagram of a network side entity according to an embodiment of the present invention.

As shown in FIG. 16, an embodiment of the present invention further provides a network side entity, which includes:

a first receiving unit 1301, configured to receive an attach request including a group identifier and sent by an MTC device to be authenticated, where the group identifier is a group identifier of an MTC group where the MTC device to be authenticated is located; and a first authentication unit 1302, configured to, when a first group authentication vector bound to the group identifier received by the first receiving unit 1301 exists, according to the first group authentication vector, authenticate the MTC device to be authenticated, and generate a system key for the MTC device to be authenticated.

Figure 17:
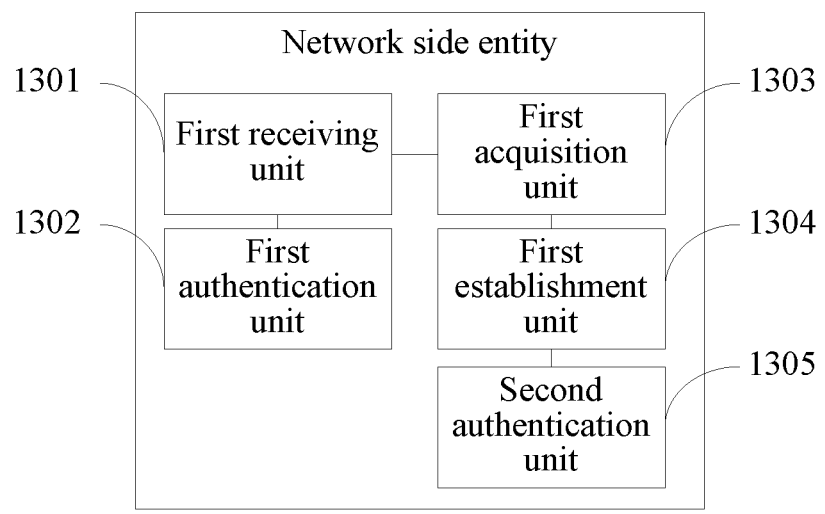
FIG. 17 is a second schematic structural diagram of a network side entity according to an embodiment of the present invention.

Further, as shown in FIG. 17, the network side entity further includes:

a first acquisition unit 1303, configured to, when the first group authentication vector does not exist, acquire the first group authentication vector from a server according to the group identifier received by the first receiving unit 1301;

a first establishment unit 1304, configured to establish a binding relationship between the group identifier received by the first receiving unit 1301 and the first group authentication vector acquired by the first acquisition unit 1303; and a second authentication unit 1305, configured to: according to the first group authentication vector acquired by the first acquisition unit 1303, authenticate the MTC device to be authenticated, and generate a system key for the MTC device to be authenticated.

Figure 18:
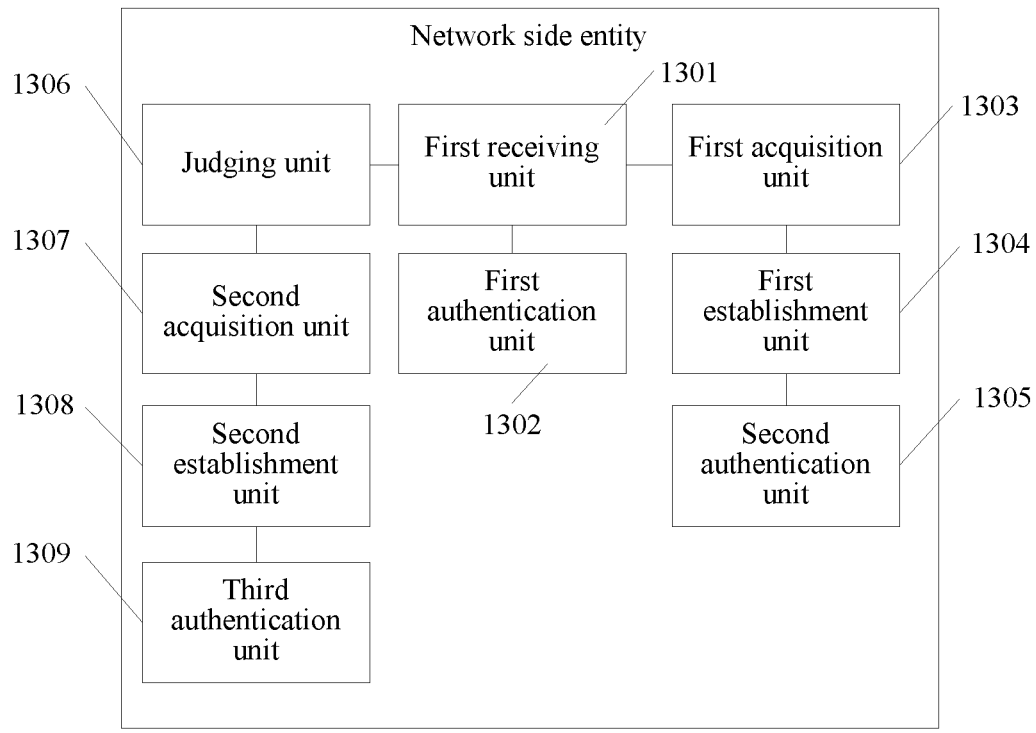
FIG. 18 is a third schematic structural diagram of a network side entity according to an embodiment of the present invention.

Further, as shown in FIG. 18, the network side entity further includes:

a judging unit 1306, configured to, when the attach request received by the first receiving unit 1301 further includes a second device characteristic used for identifying the MTC device to be authenticated, judge whether the second device characteristic is the same as a locally stored first device characteristic, where the first device characteristic is a device characteristic bound to both the group identifier and the first group authentication vector.

Further, as shown in FIG. 18, the network side entity further includes:

a second acquisition unit 1307, configured to, when the second device characteristic of the MTC device to be authenticated is the same as a locally stored first device characteristic, according to the group identifier received by the first receiving unit 1301, acquire a second group authentication vector used for authenticating the MTC devices in the MTC group;

a second establishment unit 1308, configured to establish a binding relationship among the group identifier received by the first receiving unit 1301, the second device characteristic, and the second group authentication vector acquired by the second acquisition unit 1307; and a third authentication unit 1309, configured to: according to an expected response number generated by the second group authentication vector acquired by the second acquisition unit 1307 and the second device characteristic received by the first receiving unit 1301, authenticate the MTC device to be authenticated, and according to the second group authentication vector acquired by the second acquisition unit 1307 and the second device characteristic received by the first receiving unit 1301, generate a system key of the MTC device to be authenticated.

Figure 19:
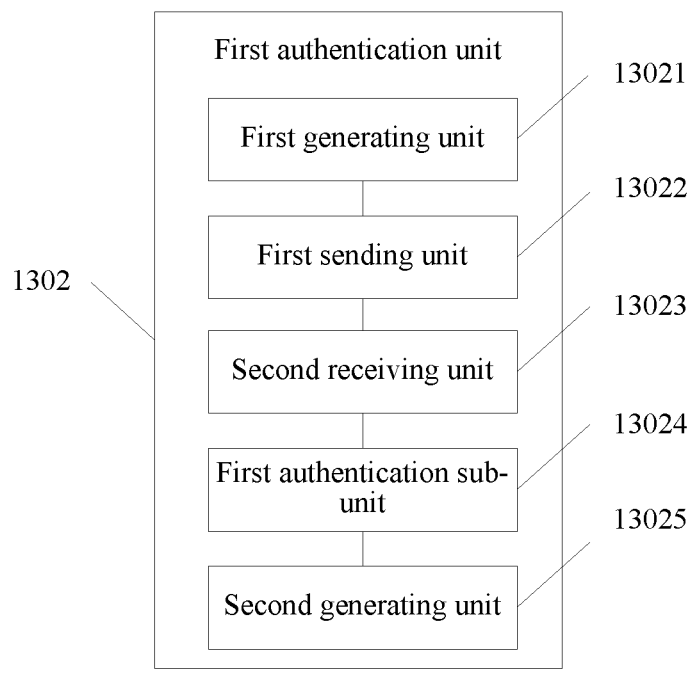
FIG. 19 is a schematic structural diagram of a first authentication unit 1302 in a schematic structural diagram of a network side entity according to an embodiment of the present invention.

As shown in FIG. 19, the first authentication unit 1302 includes:

a first generating unit 13021, configured to generate an expected response number according to the first group authentication vector and the second device characteristic that is received by the first receiving unit 1301;

a first sending unit 13022, configured to send group authentication information to the MTC device to be authenticated, so that the MTC device to be authenticated authenticates the network according to the group authentication information and generates a device side key according to the second device characteristic, where the group authentication information is information in the first group authentication vector;

a second receiving unit 13023, configured to receive a response number generated according to the second device characteristic by the MTC device to be authenticated;

a first authentication sub-unit 13024, configured to: according to the response number received by the second receiving unit 13023 and the expected response number generated by the first generating unit 13021, authenticate the MTC device to be authenticated; and a second generating unit 13025, configured to generate a network side key according to the first group authentication vector and the second device characteristic that is received by the first receiving unit 1301.

For the specific implementation method of the foregoing units, reference can be made to the method described in steps 201 to 213 or steps 301 to 313, which is not repeatedly described here again.

In the network side entity provided in the embodiment of the present invention, a group authentication vector is acquired through a group identifier shared by an MTC group, all MTC devices to be authenticated in the group are authenticated through the group authentication vector, and system keys are generated, thereby avoiding the problem that different authentication vectors need to be generated for different MTC devices in a process of authenticating and generating the system keys, so that signaling traffic is greatly reduced, and network congestion is avoided even in the case that a large number of the MTC devices access the network in a short period of time. Meanwhile, the sharing one group identifier also solves the problem that an IMSI of 15 bits is insufficient for use when the number of the MTC devices is large. Through the network side entity provided in the embodiment of the present invention, each MTC device can also be effectively authenticated in the case that a large number of the MTC devices access the network in a short period of time.

Figure 20:
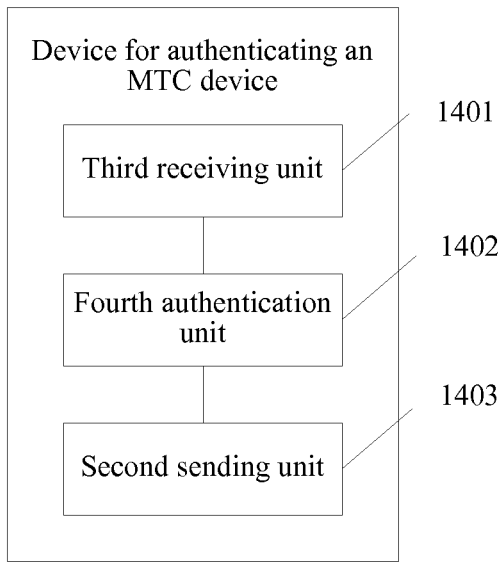
FIG. 20 is a first schematic structural diagram of a device for authenticating an MTC device according to an embodiment of the present invention.

As shown in FIG. 20, an embodiment of the present invention further provides a device for authenticating an MTC device, which includes:

a third receiving unit 1401, configured to, after authentication between the device and a network side succeeds, receive an attach request sent by a second MTC device in an MTC group where the device is located;

a fourth authentication unit 1402, configured to authenticate the second MTC device, and generate a system key for the second MTC device by using a group authentication vector generated in a process of authentication between the device and the network side; and a second sending unit 1403, configured to send the system key generated by the fourth authentication unit 1402 to the second MTC device.

Figure 21:
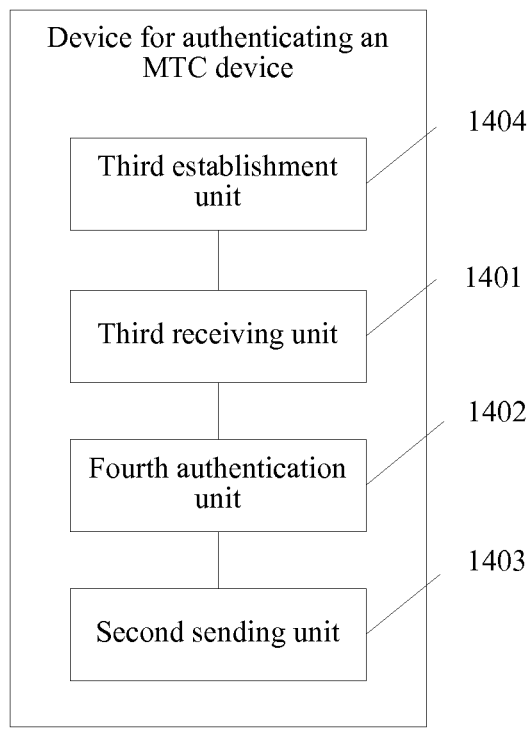
FIG. 21 is a second schematic structural diagram of a device for authenticating an MTC device according to an embodiment of the present invention.

Further, as shown in FIG. 21, the device for authenticating an MTC device further includes:

a third establishment unit 1404, configured to: after the authentication between the device and the network side succeeds, establish a binding relationship between the group authentication vector and a group identifier of the MTC group.

Figure 22:
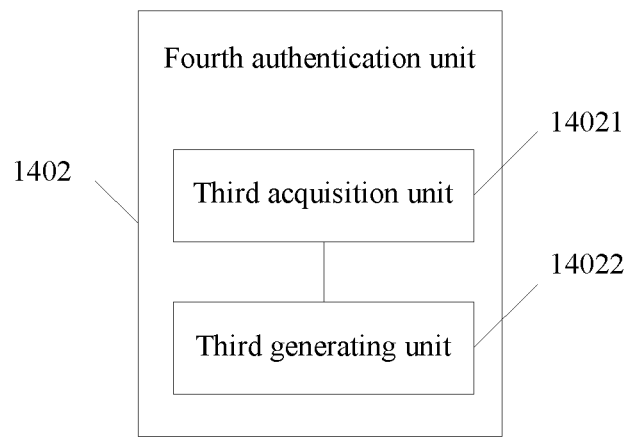
FIG. 22 is a schematic structural diagram of a fourth authentication unit 1402 in a device for authenticating an MTC device according to an embodiment of the present invention.

Further, as shown in FIG. 22, the fourth authentication unit 1402 includes:

a third acquisition unit 14021, configured to acquire the group authentication vector bound to the group identifier received by the third receiving unit 1401; and a third generating unit 14022, configured to generate a system key for the second MTC device by using the group authentication vector acquired by the third acquisition unit 14021 and a device characteristic which is of the second MTC device and is received by the third receiving unit 1401.

Figure 23:
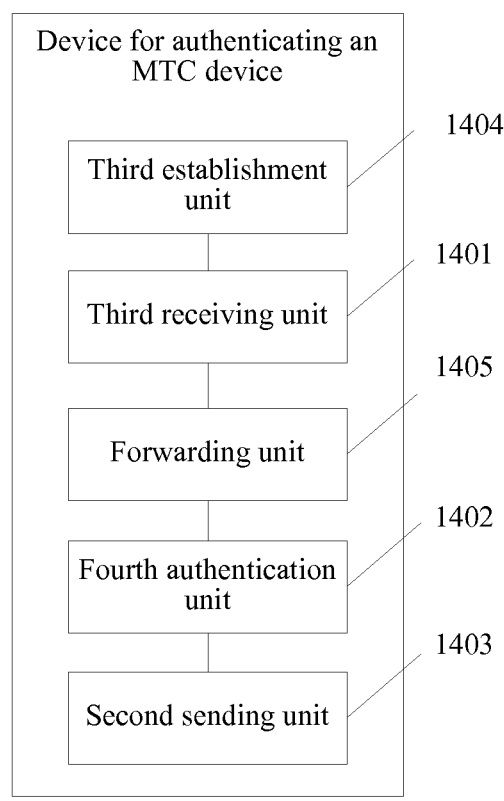
FIG. 23 is a third schematic structural diagram of a device for authenticating an MTC device according to an embodiment of the present invention.

Further, as shown in FIG. 23, the device for authenticating an MTC device further includes:

a forwarding unit 1405, configured to forward the attach request received by the third receiving unit 1401 to the network side, so that the network side generates the system key for the second MTC device by using the group authentication vector and the device characteristic which is of the second MTC device.

For the specific implementation manner of the foregoing units, reference can be made to the method described in steps 501 to 516 or steps 601 to 616, which is not repeatedly described here again.

In the device for authenticating an MTC device provided in the embodiment of the present invention, two-way authentication between a primary MTC device in an MTC group and the network side is first performed, and system keys are generated for the other successfully authenticated MTC devices in the group by using a group authentication vector generated in their two-way authentication process, thereby avoiding the problem in the prior art that it is required to use different authentication vectors to generate system keys for different MTC devices. Through the device provided in this embodiment, the signaling traffic is greatly reduced, and network congestion is avoided even in the case that a large number of MTC devices access the network in a short period of time.

Figure 24:
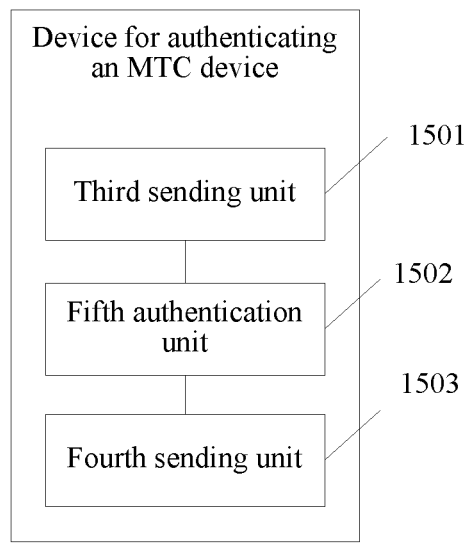
FIG. 24 is a schematic structural diagram of a device for authenticating an MTC device according to another embodiment of the present invention.

As shown in FIG. 24, an embodiment of the present invention further provides a device for authenticating an MTC device, which includes:

a third sending unit 1501, configured to send an attach request to a network side, where the attach request includes a group identifier of an MTC group where the device is located and a device characteristic of an MTC device to be authenticated in the MTC group;

a fifth authentication unit 1502, configured to perform two-way authentication between the device and the network side, and by using a group authentication vector and the device characteristic which is of the MTC device to be authenticated, generate a system key for the MTC device to be authenticated, where the group authentication vector is generated in the process of authentication between the device and the network side; and a fourth sending unit 1503, configured to, after the device successfully authenticates the MTC device to be authenticated, send the system key generated by the fifth authentication unit 1502 to the MTC device to be authenticated.

Further, the device for authenticating an MTC device further includes:

a fourth generating unit 1504, configured to, when the attach request sent by the third sending unit 1501 includes the device characteristic of the device, generate a system key of the device according to the device characteristic of the device.

For the specific implementation manner of the foregoing units, reference can be made to the method described in steps 801 to 813 or steps 901 to 913, which is not repeatedly described here again.

In the device for authenticating an MTC device provided in the embodiment of the present invention, a group authentication vector is acquired through a group identifier shared by an MTC group, system keys are generated for all MTC devices to be authenticated in the group through the group authentication vector, and the generated system keys are allocated to the MTC devices, thereby avoiding the problem in the prior art that high signaling traffic is generated because different authentication vectors need to generate system keys for different MTC devices. Through the device provided in this embodiment, the signaling traffic is greatly reduced, and network congestion is avoided even in the case that a large number of MTC devices access the network in a short period of time. Meanwhile, the sharing one group identifier also solves the problem that an IMSI of 15 bits is insufficient for use when the number of the MTC devices is large.

Figure 25:
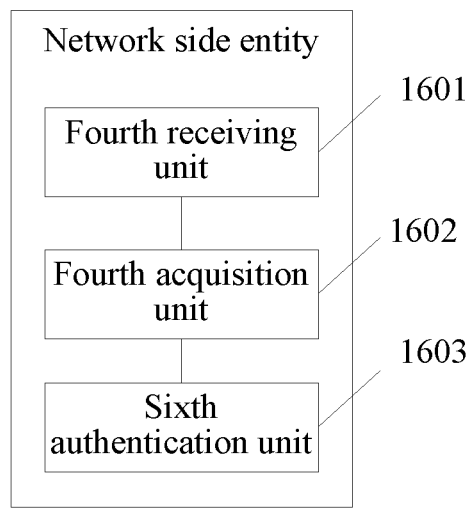
FIG. 25 is a schematic structural diagram of a network side entity according to another embodiment of the present invention.

As shown in FIG. 25, an embodiment of the present invention further provides a network side entity, which includes:

a fourth receiving unit 1601, configured to receive an attach request including a group identifier and a device characteristic, where the group identifier is a group identifier of an MTC group where an MTC device to be authenticated is located, and the device characteristic is a device characteristic of the MTC device to be authenticated;

a fourth acquisition unit 1602, configured to: according to the group identifier and the device characteristic that are received by the fourth receiving unit 1601, acquire an authentication vector of the MTC device to be authenticated; and a sixth authentication unit 1603, configured to: according to the authentication vector acquired by the fourth acquisition unit 1602 and the device characteristic received by the fourth receiving unit 1601, authenticate the MTC device to be authenticated, and generate a system key of the MTC device to be authenticated.

For the specific implementation manner of the foregoing units, reference can be made to the method described in steps 1101 to 1110 or steps 1201 to 1210, which is not repeatedly described here again.

In the network side entity provided in the embodiment of the present invention, an authentication vector is acquired by sharing one group identifier, thereby solving the problem that an IMSI of 15 bits is insufficient for use when the number of MTC devices is large. Meanwhile, different system keys are generated for different MTC devices according to different device characteristics, thereby ensuring the system security and improving the processing efficiency. Through the network side entity provided in the embodiment of the present invention, each MTC device can also be effectively authenticated in the case that a large number of the MTC devices access the network in a short period of time.

The technical solutions provided in the present invention may be applied in the technical field of authenticating the MTC device.

Those of ordinary skill in the art should understand that all or a part of the steps in the method according to the foregoing embodiments may be implemented by a program instructing relevant hardware. The program may be stored in a computer readable storage medium, such as a ROM/RAM, a magnetic disk, or a compact disk.

The foregoing descriptions are merely specific implementation manners of the present invention, but not intended to limit the protection scope of the present invention. Any variation or replacement that can be easily thought of by persons skilled in the art within the technical scope disclosed in the present invention should fall within the protection scope of the present invention. Therefore, the protection scope of the present invention should be subject to the protection scope of the claims.

What is claimed is:

1. A method for authenticating a machine type communication MTC device, comprising:

receiving an attach request comprising a group identifier and sent by an MTC device to be authenticated, wherein the group identifier is a group identifier of an MTC group where the MTC device to be authenticated is located;

determining whether a first group authentication vector bound to the group identifier exists locally, wherein the first group authentication vector is an authentication vector used for authenticating MTC devices in the MTC group;

if the first group authentication vector bound to the group identifier exists, according to the first group authentication vector, authenticating the MTC device to be authenticated, and generating a system key for the MTC device to be authenticated;

wherein each MTC device in the MTC group has a device characteristic, and the device characteristic is used to uniquely identify the MTC device in the MTC group;

the attach request further comprises a second device characteristic used for identifying the MTC device to be authenticated;

after the determining that the first group authentication vector bound to the group identifier exists locally, the method further comprises:

determining whether the second device characteristic is the same as a locally stored first device characteristic, wherein the first device characteristic is a device characteristic bound to both the group identifier and the first group authentication vector; and if the second device characteristic is different from the locally stored first device characteristic, executing the step of according to the first group authentication vector, authenticating the MTC device to be authenticated, and generating the system key of the MTC device to be authenticated.

2. The method according to claim 1, further comprising:

if the first group authentication vector does not exist, acquiring the first group authentication vector from a server according to the group identifier;

establishing a binding relationship between the group identifier and the acquired first group authentication vector; and according to the first group authentication vector, authenticating the MTC device to be authenticated, and generating a system key for the MTC device to be authenticated.

3. The method according to claim 2, wherein the method is applied in a universal mobile telecommunication system UMTS network and the method is executed by a visited location register VLR in the UMTS network; and the server is a home location register HLR in the UMTS network; or the method is applied in a long term evolution LTE network and the method is executed by a mobility management entity MME in the LTE network; and the server is a home subscriber system HSS in the LTE network.

4. The method according to claim 1, further comprising:

if the second device characteristic of the MTC device to be authenticated is the same as the locally stored first device characteristic, acquiring, according to the group identifier, a second group authentication vector used for authenticating the MTC devices in the MTC group;

establishing a binding relationship among the group identifier, the second device characteristic, and the acquired second group authentication vector; and according to an expected response number generated by the acquired second group authentication vector and the second device characteristic, authenticating the MTC device to be authenticated, and generating a system key of the MTC device to be authenticated.

5. The method according to claim 1, wherein according to the first group authentication vector, the authenticating the MTC device to be authenticated, and generating the system key of the MTC device to be authenticated comprises:
   generating an expected response number according to the first group authentication vector and the second device characteristic;
   sending group authentication information to the MTC device to be authenticated, so that the MTC device to be authenticated authenticates a network according to the group authentication information, and generates a device side key according to the second device characteristic, wherein the group authentication information is information in the first group authentication vector;
   receiving a response number generated according to the second device characteristic by the MTC device to be authenticated;
   according to the response number and the expected response number, authenticating the MTC device to be authenticated; and
   generating a network side key according to the first group authentication vector and the second device characteristic.

6. A method for authenticating an MTC device, comprising:
   after authentication between a primary MTC device in an MTC group and a network side succeeds, receiving an attach request sent by a second MTC device in the MTC group, wherein an authentication vector generated in the process of authentication between the primary MTC device and the network side is taken as a group authentication vector of the MTC group;
   authenticating, by the primary MTC device, the second MTC device, and generating a system key for the second MTC device by using the group authentication vector;
   sending, by the primary MTC device, the system key to the second MTC device;
   establishing a binding relationship between the group authentication vector and a group identifier of the MTC group;
   the receiving the attach request sent by the second MTC device comprises:
   receiving the attach request comprising the group identifier and a device characteristic of the second MTC device and sent by the second MTC device;
   the generating the system key for the second MTC device by using the group authentication vector generated in the process of authentication between the primary MTC device and the network side comprises:
   acquiring the group authentication vector bound to the group identifier carried in the attach request; and
   generating the system key for the second MTC device by using the group authentication vector and the device characteristic which is of the second MTC device.

7. The method according to claim 6, after the receiving the attach request comprising the group identifier and the device characteristic of the second MTC device and sent by the second MTC device, further comprising:
   forwarding the attach request to the network side, so that the network side generates the system key for the second MTC device by using the group authentication vector and the device characteristic which is of the second MTC device.

8. A method for authenticating an MTC device, comprising:
   sending, by a primary MTC device in an MTC group, an attach request to a network side, wherein the attach request comprises a group identifier of the MTC group, device characteristics of the primary MTC and device characteristics of the other MTC devices to be authenticated in the MTC group;
   performing authentication between the primary MTC device and the network side, and by using a group authentication vector generated in the authentication process and the device characteristics of the other MTC devices to be authenticated, generating system keys for the other MTC devices to be authenticated;
   after the primary MTC device successfully authenticates the other MTC devices to be authenticated, sending, by the primary MTC device, the system keys to the other MTC devices to be authenticated;
   the performing the authentication between the primary MTC device and the network side comprises:
   performing authentication between the primary MTC device and the network side according to the device characteristic of the primary MTC device, and generating a system key of the primary MTC device.

9. A network side entity, comprising:
   a first receiving unit, configured to receive an attach request comprising a group identifier and sent by an MTC device to be authenticated, wherein the group identifier is a group identifier of an MTC group where the MTC device to be authenticated is located;
   a first authentication unit, configured to, when a first group authentication vector bound to the group identifier received by the first receiving unit exists, according to the first group authentication vector, authenticate the MTC device to be authenticated, and generate a system key of the MTC device to be authenticated;
   a second acquisition unit, configured to, when the second device characteristic of the MTC device to be authenticated is the same as the locally stored first device characteristic, according to the group identifier received by the first receiving unit, acquire a second group authentication vector used for authenticating MTC devices in the MTC group;
   a second establishment unit, configured to establish a binding relationship among the group identifier received by the first receiving unit, the second device characteristic, and the second group authentication vector acquired by the second acquisition unit; and
   a third authentication unit, configured to:
   according to an expected response number generated by the second group authentication vector acquired by the second acquisition unit and the second device characteristic received by the first receiving unit, authenticate the MTC device to be authenticated, and generate a system key of the MTC device to be authenticated.

10. The network side entity according to claim 9, further comprising:
   a first acquisition unit, configured to, when the first group authentication vector does not exist, acquire the first group authentication vector from a server according to the group identifier received by the first receiving unit;
   a first establishment unit, configured to establish a binding relationship between the group identifier received by the first receiving unit and the first group authentication vector acquired by the first acquisition unit; and
   a second authentication unit, configured to:
   according to the first group authentication vector acquired by the first acquisition unit, authenticate the MTC device to be authenticated, and generate a system key of the MTC device to be authenticated.

11. The network side entity according to claim 9, further comprising:
a judging unit, configured to, when the attach request received by the first receiving unit further comprises a second device characteristic used for identifying the MTC device to be authenticated, judge whether the second device characteristic is the same as a locally stored first device characteristic, wherein the first device characteristic is a device characteristic bound to both the group identifier and the first group authentication vector.

12. The network side entity according to claim 11, wherein the first authentication unit comprises:
a first generating unit, configured to generate an expected response number according to the first group authentication vector and the second device characteristic received by the first receiving unit;
a first sending unit, configured to send group authentication information to the MTC device to be authenticated, so that the MTC device to be authenticated authenticates a network according to the group authentication information, and generates a device side key according to the second device characteristic, wherein the group authentication information is information in the first group authentication vector;
a second receiving unit, configured to receive a response number generated according to the second device characteristic by the MTC device to be authenticated;
a first authentication sub-unit, configured to: according to the response number received by the second receiving unit and the expected response number generated by the first generating unit, authenticate the MTC device to be authenticated; and
a second generating unit, configured to generate a network side key according to the first group authentication vector and the second device characteristic received by the first receiving unit.

13. The network side entity according to claim 9, wherein the network side entity is a visited location register VLR in a universal mobile telecommunication system UMTS network, or a mobility management entity MME in a long term evolution LTE network.

14. A device for authenticating an MTC device, comprising:
a third receiving unit, configured to, after authentication between the device and a network side succeeds, receive an attach request sent by a second MTC device in an MTC group where the device is located;
a fourth authentication unit, configured to authenticate the second MTC device, and generate a system key for the second MTC device by using a group authentication vector generated in a process of authentication between the device and the network side;
a second sending unit, configured to send the system key generated by the fourth authentication unit to the second MTC device;
third establishment unit, configured to: after the authentication between the device and the network side succeeds, establish a binding relationship between the group authentication vector and a group identifier of the MTC group;
wherein when the attach request received by the third receiving unit comprises the group identifier and a device characteristic of the second MTC device, the fourth authentication unit comprises:
a third acquisition unit, configured to acquire the group authentication vector bound to the group identifier received by the third receiving unit; and
a third generating unit, configured to generate a system key for the second MTC device by using the group authentication vector acquired by the third acquisition unit and the device characteristic which is of the second MTC device and is received by the third receiving unit.

15. The device according to claim 14, further comprising:
a forwarding unit, configured to forward the attach request received by the third receiving unit to the network side, so that the network side generates the system key for the second MTC device by using the group authentication vector and the device characteristic which is of the second MTC device.

16. A device for authenticating an MTC device, comprising:
a third sending unit, configured to send an attach request to a network side, wherein the attach request comprises a group identifier of an MTC group where the device is located and a device characteristic of an MTC device to be authenticated in the MTC group;
a fifth authentication unit, configured to perform two-way authentication between the device and the network side, and by using a group authentication vector and the device characteristic which is of the MTC device to be authenticated, generate a system key for the MTC device to be authenticated, wherein the group authentication vector is generated in the process of authentication between the device and the network side;
a fourth sending unit, configured to, after the device successfully authenticates the MTC device to be authenticated, send the system key generated by the fifth authentication unit to the MTC device to be authenticated; and
a fourth generating unit, configured to, when the attach request sent by the third sending unit comprises a device characteristic of the device, generate a system key of the device according to the device characteristic of the device.

* * * * *